United States Patent [19]
Fischer

[11] Patent Number: 5,918,540
[45] Date of Patent: Jul. 6, 1999

[54] METHOD AND DEVICE FOR PRODUCING A PRINTING STENCIL

[75] Inventor: Hannes Fischer, Worgl, Austria

[73] Assignee: Schablonentechnik Kufstein Aktiengesellschaft, Kufstein, Austria

[21] Appl. No.: 08/804,184

[22] Filed: Feb. 21, 1997

[30] Foreign Application Priority Data

Feb. 21, 1996 [EP] European Pat. Off. .............. 96102598

[51] Int. Cl.⁶ ...................................................... B41C 1/14
[52] U.S. Cl. ............... 101/128.4; 101/484; 101/DIG. 36
[58] Field of Search ................................. 101/127, 127.1, 101/128, 128.21, 128.4, DIG. 36, 170, 401.1, 467, 484, 486, 129; 347/74, 2

[56] References Cited

U.S. PATENT DOCUMENTS

| | | | |
|---|---|---|---|
| 5,384,007 | 1/1995 | Fischer | 101/128.4 |
| 5,511,477 | 4/1996 | Adler et al. | 101/401.1 |
| 5,605,097 | 2/1997 | Ruckl et al. | 101/128.4 |

FOREIGN PATENT DOCUMENTS

| | | |
|---|---|---|
| A0 590164 | 4/1994 | European Pat. Off. . |
| A0 679510 | 11/1995 | European Pat. Off. . |
| A2 508985 | 9/1975 | Germany . |
| WO92/12592 | 7/1992 | WIPO . |

*Primary Examiner*—Christopher A. Bennett
*Attorney, Agent, or Firm*—Birch, Stewart, Kolasch & Birch, LLP

[57] ABSTRACT

In the production of a printing stencil, for example a rotary printing stencil for textile printing, for the purpose of transferring a pattern stored in an electronic memory, liquid is applied to the lateral surface of the printing stencil as it rotates. A nozzle which supplies the liquid is driven by pattern data belonging to the pattern. Pattern data situated earlier or later in the circumferential direction of the stencil cylinder are read out as a function of at least one deviation between the actual and desired positions of the lateral surface which respect to the pattern data belonging to the desired position, in order to prevent distortion of the pattern owing to the deviation.

17 Claims, 8 Drawing Sheets

METHOD AND DEVICE FOR PRODUCING A PRINTING STENCIL

BACKGROUND

1. Field of the Invention

The invention relates to a method and to a device for producing a printing stencil. In particular, the present invention is directed to preventing displacement in a stencil to be provided using a liquid spray.

2. Conventional Art and Problem

A method for producing a rotary printing stencil is known in which, for the purpose of transferring a pattern stored in an electronic memory, liquid is sprayed out of a nozzle onto a stencil cylinder and applied to the lateral surface of the latter as it rotates the nozzle is driven in accordance with pattern data belonging to the pattern stored in the electronic memory.

The device used for this purpose contains a bearing device for rotatably bearing the stencil cylinder, an electronic memory for storing the pattern, at least one nozzle for spraying out liquid, in order to transfer the pattern onto the lateral surface of the stencil cylinder, and a control device which reads out the pattern with the stencil cylinder rotating and drives the nozzle in accordance with the pattern data read out.

It has been shown that even relatively small and, in particular, relatively strong deviations of the lateral surface of the stencil cylinder from the ideal circular cylindrical form lead to strong displacements of the pattern image in the circumferential direction of the stencil cylinder. The radial eccentricity of the lateral surface of the stencil cylinder gives rise to patterning errors in the tangential direction, because the time between a liquid drop being sprayed out from the nozzle and the liquid reaching the lateral surface becomes longer when the lateral surface moves away from the nozzle and the pattern image is thereby generated on the stencil cylinder with a delay. A corresponding displacement of the pattern image in the circumferential direction also occurs when the lateral surface of the stencil cylinder approaches the nozzle, and premature generation of the pattern image thereby results.

SUMMARY OF THE INVENTION

It is the object of the invention to develop a method and a device of the type mentioned at the beginning such that pattern images to be generated by applying liquid can be produced without distortion even in the case of relatively strong radial eccentricities of the stencil cylinder.

A method for producing a printing stencil according to the invention includes reading out pattern data situated earlier or later in the circumferential direction of the stencil cylinder as a function of at least one deviation between the actual and desired positions of the lateral surface with respect to the pattern data belonging to the desired position, in order to prevent displacement or distortion of the pattern owing to the deviation.

In other words, it is proposed according to the invention that the error which, by the lengthening or shortening of that time which the liquid requires from being sprayed out from the nozzle until impinging on the lateral surface of the stencil cylinder, should be compensated by feeding the pattern data earlier or later to the nozzle as a function of the radial eccentricity.

The deviation between the actual and desired positions of the lateral surface in the region where the liquid is applied can in certain circumstances be known or prescribed, so that it is then possible, as a function thereof, correspondingly to address the pattern data to be called up earlier or later, with reference in each case to the pattern data belonging to the desired position. On the other hand, the deviation between the actual and desired positions of the lateral surface in the region where the liquid is applied can alternatively be determined, specifically by measuring an actual radial position of the lateral surface at at least one measuring point outside the region in which liquid is applied, or else at the location where the liquid is applied when, for example, the nozzle itself is constructed as a ranging sensor or carries such a ranging sensor at its outlet.

It is also possible to measure the radial distance in a circumferential plane of a cylinder which lies outside that in which liquid is currently being applied. The deviation between the actual and desired positions of the lateral surface, or the pattern displacement in the region where the liquid is applied can then be determined from this measurement, specifically either as a function only of the radial eccentricity, as a function of the radial and tangential eccentricities, or as a function only of the tangential eccentricity of the lateral surface with regard to its respective desired tangential position or desired radial position.

The measurement of the actual radial position of the lateral surface at at least one measuring point, for example outside the region in which liquid is being applied, or inside this region, is generally sufficient for determining radial eccentricity and tangential eccentricity in the region where liquid is applied whenever a more or less strongly rounded out stencil cylinder is concerned whose wall does not vibrate during application of the liquid or during the work of engraving.

If, by contrast, the stencil cylinder is a thin-walled hollow cylinder whose thin hollow cylinder envelope is excited to vibrate by faults, then according to a development of the invention the actual radial position of the lateral surface of the hollow cylinder must be measured at three measuring points spaced apart from one another in the same circumferential plane, in order to determine therefrom the deviation between the actual and desired positions of the lateral surface in the region where liquid is applied, or to determine the pattern displacement, that is to say the radial and tangential eccentricities. In this case, an undistorted stencil pattern can be applied to the lateral surface even when the hollow cylinder envelope is vibrating.

Of course, one or more ranging sensors could also be arranged fixed at a distance from one another relative to the stencil cylinder in the longitudinal direction thereof, in order to measure actual radial positions of the cylinder wall simultaneously at a multiplicity of longitudinal positions. It would likewise be possible to use the respective measurement results to calculate the pattern displacement in the region where liquid is applied.

In order to achieve even better engraving results in the case of thin-walled hollow cylinders, in particular, the latter can be provided with an overpressure in the interior, in order in this way to prevent deviations from the circular cylinder form and to suppress vibrations of the cylinder wall.

According to a further refinement of the invention, the pattern data occurring earlier or later (seen in each case in the circumferential direction of the stencil cylinder) are read out by activating an address counter, which addresses the electronic memory, as a function of the pattern displacement determined. Depending on the magnitude and sign of the deviation, the address counter is thereby advanced or reset in order in this way to be able to access the relevant pattern data. The magnitude of an offset is thus determined for the address counter by the deviation.

A device according to the invention includes an address changeover device for changing over a count value of an address counter for the electronic memory as a function of at least one deviation between the actual and desired positions of the lateral surface in the region where the liquid is applied. In this case, at least one ranging sensor can be present for measuring the actual radial position of the lateral surface of the stencil cylinder, which sensor can be situated inside or outside the region where the liquid is applied, it being the case that the address changeover device generates an address changeover signal for activating the address counter as a function of the output signal of the ranging sensor. The address changeover signal can also be designated as an offset signal.

The method according to the invention is suitable first and foremost for producing rotary printing stencils, but it is also suitable for producing planographic printing stencils. It is possible in the last-mentioned case, for example, for a flat stencil to be clamped onto the lateral surface of a cylinder and patterned by means of applying liquid, in order subsequently, and possibly after further processing steps, to be removed from the cylinder and used as a planographic printing stencil.

Moreover, it is possible in the case of the method according to the invention to spray the liquid from the nozzle directly onto the lateral surface of the stencil cylinder, or to use a printing tool to transfer the liquid onto the lateral surface of the stencil cylinder after it has been sprayed out from the nozzle.

The stencil cylinder itself can take various embodiments. It can, on the one hand, be a screen cylinder, that is to say a thin-walled and uniformly perforated hollow cylinder, onto which, for example, covering liquid is sprayed by means of the nozzle in order to seal screen openings as required by the pattern. However, it can also be an elastic solid cylinder whose surface is electrically conductive and is provided with a pattern by means of applied liquid in order subsequently to form a screen cylinder on the surface, for example by a nickel-coating operation. However, the stencil cylinder can also be one which is suitable for producing flexographic printing formes or platen or letterpress formes.

Likewise, patterns can be applied to the surface of the respective stencil cylinder in a different way if it is only ensured that the overall patterning process contains a step by means of which liquid sprayed out from a nozzle passes onto the surface of the stencil cylinder as required by the pattern. It has already been mentioned above that the liquid can seal screen openings directly, for example in the case of a hollow cylindrical screen. However, the latter can also bear on its outer surface a continuous lacquer layer which initially seals all the screen openings. By applying the liquid to produce the pattern on the circumferential surface of the lacquer layer, the latter can be partially masked if an opaque substance is used as the liquid, with the result that screen regions required by the pattern can subsequently be uncovered again by exposing and developing the lacquer layer. In a similar way, lacquer layers which are sensitive to light can also be present on other stencil cylinders and can be masked as required by the pattern by means of applied liquid, in order to be able to produce others of the stencils.

The printing or rotary printing stencils according to the invention are preferably used in the field of textile printing, but can also be applied for printing other materials, for example paper.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENT

Figure 1:
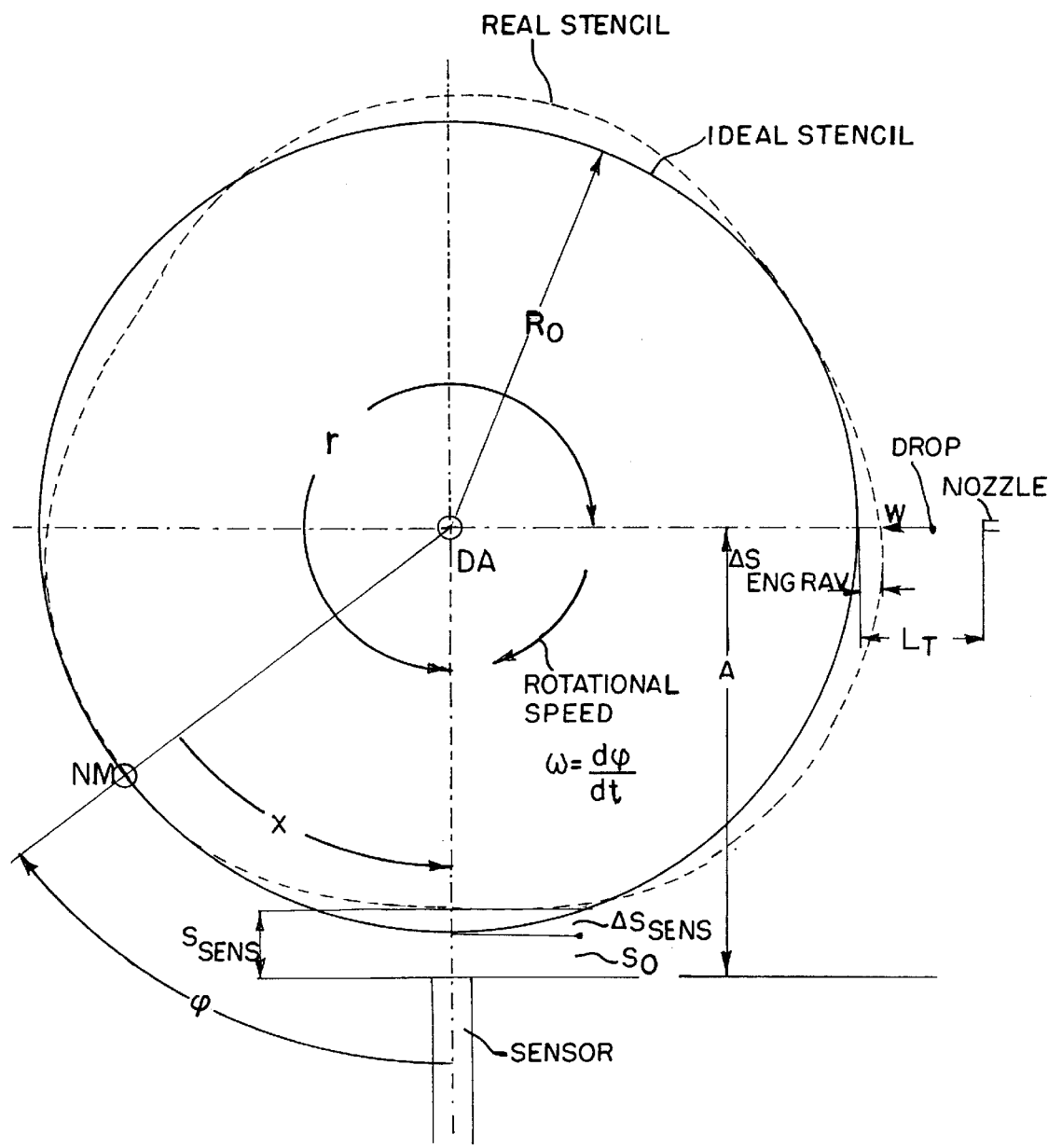
FIG. 1 shows the relationships in the case of a thin-walled hollow cylinder whose cylinder wall is vibrating.

When engraving, for example, circular cylindrical screen printing stencils on a machine specifically for this purpose (=engraving machine), an accurate concentricity is very important for the error-free matching of the different color which are printed using a set of such stencils. Deviations of the cross-sections of the stencil from the circular shape and eccentric positions of the centre of a cross-sectional circle with respect to the axis of rotation of the engraving machine cause pattern images on the screen cylinder which are inaccurately engraved and displaced in the circumferential direction. For example, considering real round stencil, that is to say a thin-walled circular, and possibly perforated hollow cylinder, for example, which normally has a diameter of 200 to 300 mm, a length of 1000 to 3000 mm and a wall thickness of 0.1 mm, it may be stated that with respect to the targeted circular cylindrical shape said stencil has form variations which can amount to a few tenths of a millimeter. Of course, when determining these form variations it is important how the hollow cylinder is clamped during the measurement. If, for example, the round stencil is placed with one of its end cross-sections on the ground, the form variations of the real round stencil can even increase up to a few millimeters with respect to an ideal circular cylinder of the same size.

It was assumed in the case of the above information on the form variations that the two end faces of the stencil are retained by accurately concentric clamping devices, for example are clamped on accurately concentric internal chucks, or that concentric conical end pieces of the type of the work-holding centres of a lathe engage in the open end faces of the stencil. Given appropriately accurate design of these clamping devices, the thin round stencil will exhibit a sufficiently slight eccentricity at its ends, but will show ever stronger deviations from concentricity towards its center because of internal stresses. If these deviations are measured by a contactless measuring method, for example inductively or optically, the radial eccentricities of a few tenths of a millimeter already mentioned above are found towards the centre of the stencil.

The measurement of the radial eccentricities is finally intended to permit compensation of these errors by suitable technical measures, with the result that engraving errors are avoided. The measuring device is denoted here as a sensor, and is intended to be optical or inductive, but in any case contactless, method to establish the perpendicular distance between a reference point permanently connected to it and the stencil wall moving past.

Physical variables of the environment of the stencil influence the radial eccentricities, as a result of which these deviations are either amplified or diminished. Thus, for example, a pressure which is applied in any way at all to the inside of the stencil acts on the latter to round it out, that is to say the stencil is more closely approximated to the shape of a circular cylinder by the membrane stresses which form.

Temporally variable forces acting on the stencil excite the latter to vibrations, and can amplify the deviations. Such forces are released, for example, by poor rotary actuators. As experiments have shown, these dynamic deviations of the hollow cylinder wall from concentricity, which are superimposed on the static form errors, can likewise be diminished by a pressure acting on the inside of the stencil. The pressure evidently damps the vibrations of the stencil, something which will be gone into later once again. However, it is not mandatory.

The geometrical description of the errors requires suitable coordinates to be agreed with respect to the stencil and the measuring device. Each stencil bears somewhere on its circumference a zero mark NM or a passer mark whose position is initially fixed arbitrarily, but remains permanently connected to the stencil. The polar coordinate system likewise permanently connected to the stencil can be defined by means of this mark in the following way, as is explained with the aid of FIG. 1:

The origin of the coordinate system K.S. lies on the axis DA of rotation of the stencil.

The radial direction is normal to this axis DA of rotation.

The angle $\chi=0$ is given by the connection with the 0 mark NM.

The orientation of the angular coordinate $\chi$ is such that values for $\chi$ are to be counted positive when they point against the direction of rotation of the stencil.

The angular position $\phi$ of the rotating stencil with respect to the sensor is measured between the latter and the zero mark NM provided on the stencil. It holds under these preconditions that $$\phi = \chi. \tag{1}$$

In the case of all engraving machines, provision is made for the purpose of measuring the angle $\phi$ of rotation of an encoder which transmits a zero pulse agreeing with the position of the zero mark, and in addition subdivides the angle of a full rotation (360 degrees=2 $\pi$) into $N_{um}$ pulses. The $N_{um}$-th pulse of the preceding rotation is transmitted in congruence with the zero pulse of the following rotation. In order to convert from the angle $\phi$ of rotation to the k-th pulse, and vice versa, the relations $$\varphi = \frac{k}{N_{um}} \cdot 2 \cdot \pi \text{ or } k = \frac{\varphi}{2 \cdot \pi} \cdot N_{um} \tag{2}$$

when the angle $\phi$ is measured in radians, or $$\varphi = \frac{k}{N_{um}} \cdot 360 \text{ or } k = \frac{\varphi}{360} \cdot N_{um} \tag{3}$$

when the angle is measured in degrees, can be formed. Since k can only be an integer, it is necessary in the case of this angle measuring technique to limit oneself to discrete, but certainly very fine angular steps for $\phi$.

The description of the error picture is best done by expanding the deviations, occurring over one rotation of the stencil, in the radius of the real stencil with respect to an ideal stencil, that is to say a circular cylindrical stencil, mounted concentrically with respect to the axis of rotation, having the constant radius $R_0$ in a Fourier series.

$$R(\chi) = R_0 + \sum_{i=1}^{m} a_i \cdot \cos(i \cdot \chi) + b_i \cdot \sin(i \cdot \chi) = \tag{4}$$

$$R_0 + \sum_{i=1}^{m} c_i \cdot \cos(i \cdot \chi + \varepsilon_i)$$

This is the representation of the stencil radius in the defined stencil-fixed coordinate system. The distance measured from the sensor to the rotating real stencil is then $s(\chi)=A-R(\chi)$ and with the use of the angular position $\phi$ between zero mark and sensor it holds because of (1) that $$s_{sens}(\varphi) = \underbrace{A - R_0}_{s_0} - \sum_{i=1}^{m} [a_i \cdot \cos(i \cdot \varphi) + b_i \cdot \sin(i \cdot \varphi)] = \tag{5}$$

$$A - R_0 - \sum_{i=1}^{m} c_i \cdot \cos(i \cdot \varphi + \varepsilon_i) = s_0 - \sum_{i=1}^{m} c_i \cdot \cos(i \cdot \varphi + \varepsilon_i)$$

In this representation, the series term of the zeroth order $S_0$ is the distance of the sensor from the ideal stencil. The term of first order $C_1$ corresponds to a simple eccentricity of the center of the cross-sectional circle of the stencil which has just been measured. $C_1$ can also be of considerable magnitude in the case of an accurately circular cylindrical cross-section. When considering the Fourier series expansion for the stencil radius for a few cross-sections of the stencil which follow one another in the longitudinal direction, the terms of first order respectively applying to these cross-sections correspond to a deviation in the longitudinal axis of the stencil from a straight line, and thus represent a bending of this longitudinal axis. This bending cannot be counteracted by a pressure acting on the inside of the stencil.

The series term of second order corresponds to a deviation in the cross-section resulting in an oval, and can be led towards zero even by slight pressure actions on the inside of the stencil. The series term of third order corresponds to a deviation of the stencil cross-section from concentricity resulting in a triangle, and can likewise be compensated by an internal pressure.

7

A similar statement holds for all the following deviations of higher order. However, the compensation of the radial eccentricities requires a higher internal pressure the higher the Fourier order of deviation. It can be shown that the radial eccentricities can be returned to zero completely only by an infinitely high internal pressure. In the case of a finite internal pressure, a residual error remains which is proportional to the amplitude $c_i$ of the error series term, which can be established in the case of a stencil without internal pressure.

Figure 2:
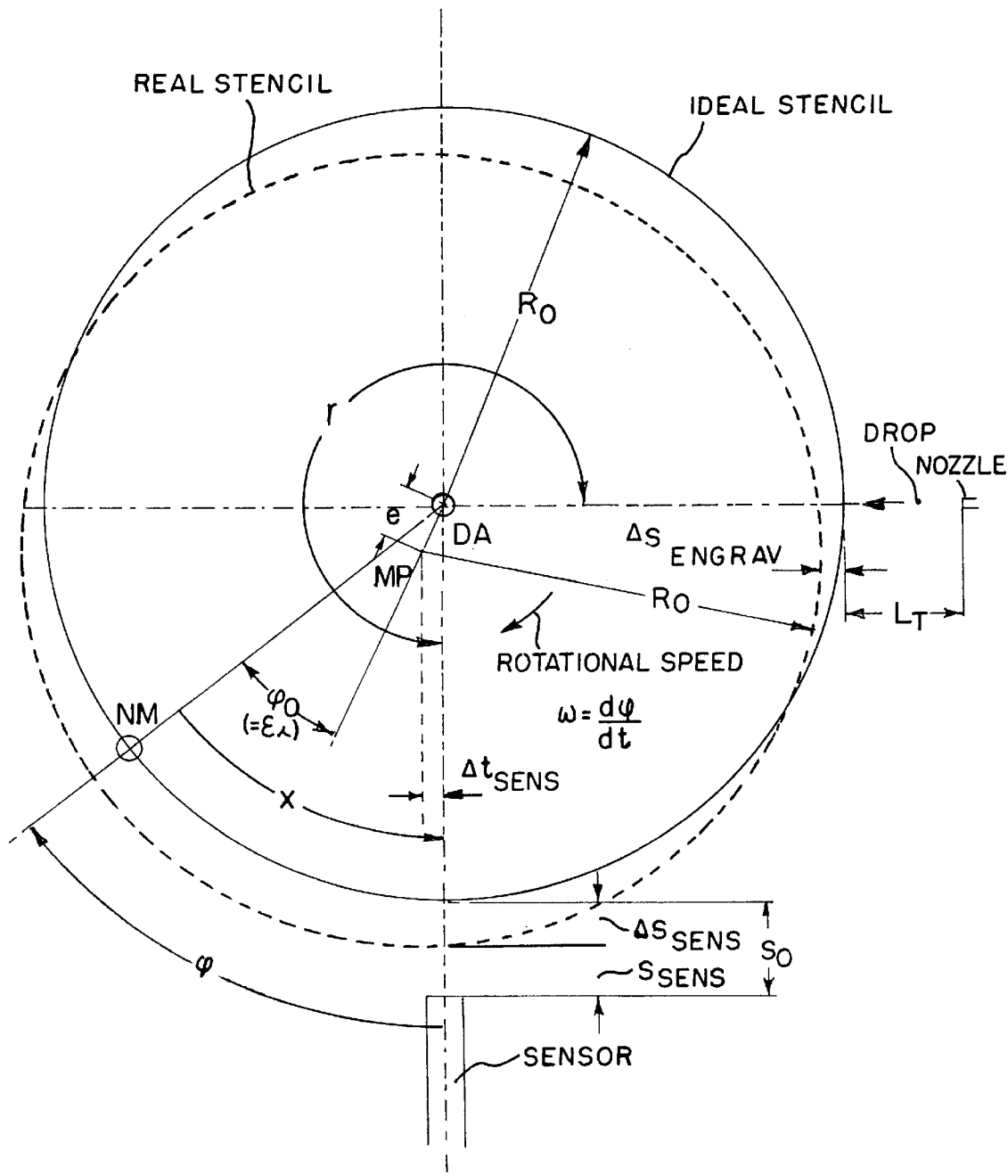
FIG. 2 shows the relationships in the case of a thin-walled hollow cylinder which is rounded out circularly but is mounted eccentrically.

I. Measuring and processing the radial eccentricity in the case of a stencil stabilized and rounded out by internal pressure (FIG. 2)

It is now presupposed that a round stencil is present which is largely rounded out by a pressure acting on its interior, and which also does not vibrate because of this internal pressure. The stabilization by means of internal pressure can be explained as follows, for example. Vibrations of a thin circular cylindrical membrane are produced in such a way that the cross-sectional surface bordered by the membrane is then accurately circular and therefore at a maximum when the instantaneous value of the amplitudes of vibration passes precisely through zero. Every deviation caused by a vibration reduces the internal cross-section of the stencil, as a result of which either the gas located in the interior of the stencil is adiabatically compressed, or this gas is caused by a slight rise in pressure to flow more quickly out of the stencil through bores which have already been opened. Energy is extracted from the vibration process thereby, which means that vibrations of the thin membrane are damped by the gas cushion in the stencil interior. This statement does not, however, hold for flexural vibrations of the stencil, in the case of which the individual cross-sections of the stencil remain circular. These vibrations are counteracted only by the internal material damping. However, as a consequence of the large planar moment of inertia of the stencil cross-sections and the slight mass of the stencil the frequency of the natural flexural vibration is so high from the start that its form of vibration is scarcely excited.

In the case of a stencil on which an internal pressure acts, the remaining radial eccentricities will essentially be established only as those which are conditioned by the bending of the stencil axis, that is to say the eccentricities of the individual cross-sections of the stencil. During engraving of the real stencil, these eccentricities cause geometrical errors in the pattern image generated, that is to say deviations in the position and the form of the pattern image with respect to one which would be engraved on an ideal, concentrically running and accurately circular cylindrical stencil.

These geometrical errors consist of a displacement of the position of the engraved image in the circumferential direction. This displacement has two causes. Firstly, because of the eccentricities in the stencil cross-sections, there are different circumferential lengths inside angular sections of equal size. This causes an incorrect circumferential position of the pattern, which from now is to be termed an incorrect circumferential position of the first type. Secondly, given different distances of the stencil wall from the nozzle, drops ejected from the nozzle impinge too early or too late on the stencil wall, and this causes a further component of the incorrect circumferential position of the pattern, which is to be called the incorrect circumferential position of the second type.

On the basis of the designations of FIG. 2, it follows from equation (5) for the distance change in the stencil wall of the real stencil by comparison with the ideal stencil at the location of the sensor that

8

$$\Delta s_{sens} = s_0 - s_{sens}(\phi) = c_1 \cdot \cos(\phi - \epsilon_1) \quad (6)$$

If, by contrast with the instantaneous position shown in FIG. 2, the stencil has rotated further by the angle Γ, this error must be taken into account when liquid drops emerge from a nozzle. From a direct geometrical consideration with the aid of this FIG. 2, the radial distance change is also yielded as $$\Delta s_{sens} = e \cdot \cos(\phi - \epsilon_1) \quad (7)$$

The result for the tangential displacement of the wall of the real stencil by comparison with the ideal stencil is, in the same way:

$$\Delta t_{sens} = e \cdot \sin(\phi - \epsilon_1) \quad (8)$$

It is to be seen from a comparison with (6) that the eccentricity e corresponds to the amplitude $c_1$. Both the incorrect radial position and the incorrect tangential position of the stencil wall must be taken into account for a geometrically correct pattern application. Otherwise, the incorrect tangential position of the stencil wall produces the incorrect circumferential position of the first type of the pattern. As a consequence of the flying speed of the liquid drops, which corresponds approximately to the circumferential speed of the stencil, the incorrect radial position of the stencil wall produces a further incorrect circumferential position of the pattern, specifically the incorrect circumferential position of the second type.

In addition to the angle $\phi$ of rotation, the angle $\epsilon_1$ also appears in equations (7) and (8). This angle denotes the phase angle of the maximum in the first series term in the Fourier expansions (4) and (5). As may easily be seen on the basis of the geometrical relationships represented in FIG. 2, this phase angle corresponds to the angle $\phi$ which the straight line connecting the center of the real stencil cross-section to the centre of rotation and the straight line connecting the zero mark to the center of rotation enclose between them.

Equations (7) and (8) also show that the fluctuation in the position of a point on the stencil circumference in the tangential direction leads with respect to the fluctuation of the stencil wall, in the radial direction by an angle of rotation of 90 degrees or—which is in principle the same thing—by $N_{um}/4$ encoder pulses. The last statement means, however, that the magnitude of the incorrect pattern position of the first type to be expected is measured and stored by ¼ of the rotation of the stencil earlier than the associated radial distance fluctuation. In other words if the incorrect radial position of a point on the stencil circumference is located at a memory location with the address k for said point, then the incorrect circumferential position of the first type of a pattern to be applied with respect to the corresponding point of the ideal stencil was filed at the memory location with the address $k - N_{um}/4$.

Considering that at the engraving point, that is to say the point at which the liquid drops impinge, the same distance and circumferential fluctuations occur under the preconditions valid here as in the case of the sensor, it is possible to set up the following rule in order largely to compensate engraving fluctuations:

In order to compensate for the errors in the pattern image of a stencil which rotates with an eccentricity e but is otherwise circularly cylindrical, the radial distance $s_{sens}$ must firstly be measured by means of a ranging sensor. The difference value $\Delta s_0 - s_{sens} = s_{sens}$ is formed therefrom, and this value is filed in the memory location k. After a further $$N_\Gamma = N_{um} \cdot T/2 \cdot \pi - L_T \cdot \omega \cdot N_{um}/(w \cdot 2 \cdot \pi) \quad (9)$$

pulses received from the encoder, this value is read out again from the memory location k and used to determine the incorrect circumferential position of the second type. The first summand in the relationship (9) corresponds to that number of pulses which the encoder emits between the instant when a circumferential point appears at the sensor and that of its appearance at the point of drop impingement. This instant would, however, already be too late for a correction decision. This decision must be advanced by the flying time $L_T/w$ of the drops from the nozzle mouth up to the stencil, that is to say reading out the distance differences must be performed earlier. This smaller number of pulses is specified by the relationship (9). The measured distance $s_{sens}$ or the difference value $\Delta s_{sens} = s_0 - s_{sens}$ calculated therefrom is positive if the real position of the stencil wall moves, by comparison with its ideal position, nearer to the sensor or to the nozzle. Conversely, this difference value becomes negative when the stencil wall moves back from the sensor or from the nozzle. If the wall moves nearer to the nozzle, then—if no correction is performed—the drops impinge too early on the wall, that is to say they impinge on the stencil at a location which should already have been bypassed and which actually ought to have been patterned in accordance with the content of a memory location with a low address. Here, the direction of rotation of the stencil is to be selected by definition such that the addresses pass by the nozzle in an ascending sequence.

If the stencil rotates at the angular velocity $\omega$, if the drops move at the flying speed w and if the radius R0 of the stencil is measured outwards here from the centre of the circular cross-section, it holds in length units for the incorrect circumferential position of the second type of the pattern:

$$\Delta t_{noz,2} < k+N_\Gamma > = (\Delta s_{Sens} < k > /w) \cdot R0 \cdot \omega \quad (10)$$

This incorrect circumferential position must be converted into units of the address counter so that the correct memory location with the low address can be determined. It holds for this conversion that:

$$\Delta z_2 < k + N_r > = -(N_{um}/2 \cdot \pi \cdot R0) \cdot \Delta t_{noz \cdot 2} < k + N_r > = \quad (11)$$
$$-(N_{um}/2 \cdot \pi \cdot R0) \cdot (\Delta s_{Sens} < k > /w) \cdot R0 \cdot \omega =$$
$$-\frac{N_{um}}{2 \cdot \pi} \cdot \Delta s_{Sens} < k > \cdot \frac{\omega}{w}$$

The notation employed is intended to signify: extract $\Delta_{sens} < k >$ from the memory location k upon receiving the $<k+N_\Gamma>$-th pulse, and determine thereby the address count difference $\Delta Z_2 < k+N_\Gamma >$, which must be taken into account in the case of the $<k+N_\Gamma>$-th pulse. The negative sign in the relationship (10) takes account of the fact already discussed that the address is to be increased in the case of positive values of $\Delta s_{sens} < k >$.

The incorrect circumferential position of the first type is determined purely geometrically and has already been specified by the relationship (8). It has already been established there that the value of this incorrect position was already measured by the sensor $N_{um}/4$ encoder pulses earlier than the associated incorrect distance position and was stored in a memory location whose address is smaller by $N_{um}/4$ count units. It therefore holds that:

$$\Delta t_{noz,1} < k+N_\Gamma > = \Delta s_{Sens} < k - N_{um}/4 > \quad (12)$$

This relationship also expresses the incorrect position in length units. To calculate the address difference value, it is necessary to multiply $\Delta t_{noz.1} < k+N_\Gamma >$ by the factor $N_{um}/2 \cdot \pi \cdot R0$.

This factor corresponds to the ratio:

Encoder pulses per rotation/circumference of the stencil.

The address difference to be taken into account for correcting the incorrect circumferential position of the first type is then yielded as $$\Delta z_1 < k + N_r > = (N_{um}/2 \cdot \pi \cdot R0) \cdot \Delta t_{noz \cdot 1} < k + N_r > = \quad (12a)$$
$$(N_{um}/2 \cdot \pi \cdot R0) \cdot \Delta s_{Sens} < k - N_{um}/4 >$$

The sign differs by comparison with the relationship (10). Specifically, if the distance difference $\Delta s_{sens} < k - N_{um}/4 >$ is positive, then the stencil leads, that is to say there is present at the drop impingement point a location of the stencil wall which is to be patterned in accordance with the content of a higher address of the pattern memory. The relationship (12a) states: upon receiving the $<k+N_\Gamma>$-th pulse, extract from the memory location $<k-N_{um}/4>$ the value $\Delta s_{sens} < k-N_{um}/4 >$ stored there, and calculate the address difference $\Delta z_1$ in accordance with (12a).

Once the two address differences $\Delta z_1$ and $\Delta z_2$ are formed, calculate the address $k+N_\Gamma+\Delta z_1+\Delta Z_2$ and clear from this address of the pattern memory the correct pattern information, which is formed for an ideal stencil free from radial eccentricities and which specifies whether a drop is to be ejected from the nozzle or not.

II. Measuring and processing the radial eccentricity in the case of an unpressurized stencil whose wall does not vibrate during the engraving work Consideration will now be given to a thin cylindrical screen stencil or just such an unperforated hollow cylinder, the two ends of which are held by two accurately concentric clamping devices, and to which an excess pressure is not applied on its inside. However, the intention is that because of a high-quality rotary drive the stencil wall is not excited to vibrate. In the case of such a stencil, radial eccentricities are to be expected whose Fourier representation contains substantial values for series members of higher order. All these radial eccentricities are static, that is to say they rotate with the stencil or—put another way—they do not change in a coordinate system fixed in the stencil. The cross-section of such a stencil has already been represented in FIG. 1.

Here, as well, the incorrect circumferential position of the pattern which is produced has two causes. An incorrect circumferential position of the first type is produced because equal component angles of the stencil contain different circumferential lengths. Furthermore, the incorrect circumferential position of the second type is produced because drops which because of the distance fluctuations impinge too early or too late on the stencil wall become attached at wrong points on the stencil circumference. Here, as well, the incorrect positions must be compensated by calling up the pattern information from the memory of the computer earlier or later or—more precisely—the pattern information must already be retrieved from a corrected memory address at the instant when the drop is ejected from the nozzle.

The first step is to determine the incorrect circumferential position of the first type and, furthermore, the change in address required for its correction. $s_{sens}$ is measured in the case of each received encoder pulse. If, for example, the computer has just received the k-th pulse, it then forms $\Delta s_{sens}(K) = s_0 - s_{sens}(k)$ and stores this value in a memory location with the address k. It is then possible to calculate from two successive measured values $\Delta s_{sens}(k)$ and $\Delta s_{sens}(k+1)$ the length of the segment of the stencil circumference situated between these measuring points as $$db(k) = \sqrt{(\Delta s_{Sens}(k) - \Delta s_{Sens}(k+1))^2 + (R_0 + \Delta s_{Sens}(k) + \Delta s_{Sens}(k+1))^2 \cdot (\pi/N_{um})^2} \quad (13)$$

Summing these sublengths then produces $$Umf_{act}(k) = \sum_{i=1}^{k} db(i) \quad (14)$$

for the actual length of the stencil circumference located between the zero pulse and the k-th pulse.

The desired circumference of the ideal comparison stencil—which has the radius $R_0$—up to the k-th measuring point is yielded as $$Umf_{des}(k) = 2 \cdot \pi \cdot \frac{k}{N_{Um}} \cdot R_0 \quad (15)$$

The difference between these two values should correspond to the displacement error in the pattern in the circumferential direction. Since, however, there are always influences which cause substantial circumferential differences, for example thermally conditioned changes in position of the sensor or a slightly larger stencil diameter or the polygonal effect conditioned by the division of the stencil circumference into $N_{um}$ measuring points, it is expedient to determine after each complete rotation of the stencil a correction factor which is available during the following rotation for the correction of the subtraction. The correction factor is determined from $$K_{corr} = \frac{Umf_{des}(N_{Um})}{Umf_{act}(N_{Um})} \quad (16)$$

The incorrect pattern position of the first type is then yielded from the difference $$\Delta U1 = Umf_{des}(k) - K_{corr} Umf_{act}(k) \quad (17)$$

The address correction required for compensating the incorrect circumferential position of the first type then becomes:

$$\Delta z_1 \langle k+N_\Gamma \rangle = (N_{um}/2 \cdot \pi \cdot R0) \cdot \Delta U1 \quad (18)$$

Figure 3:
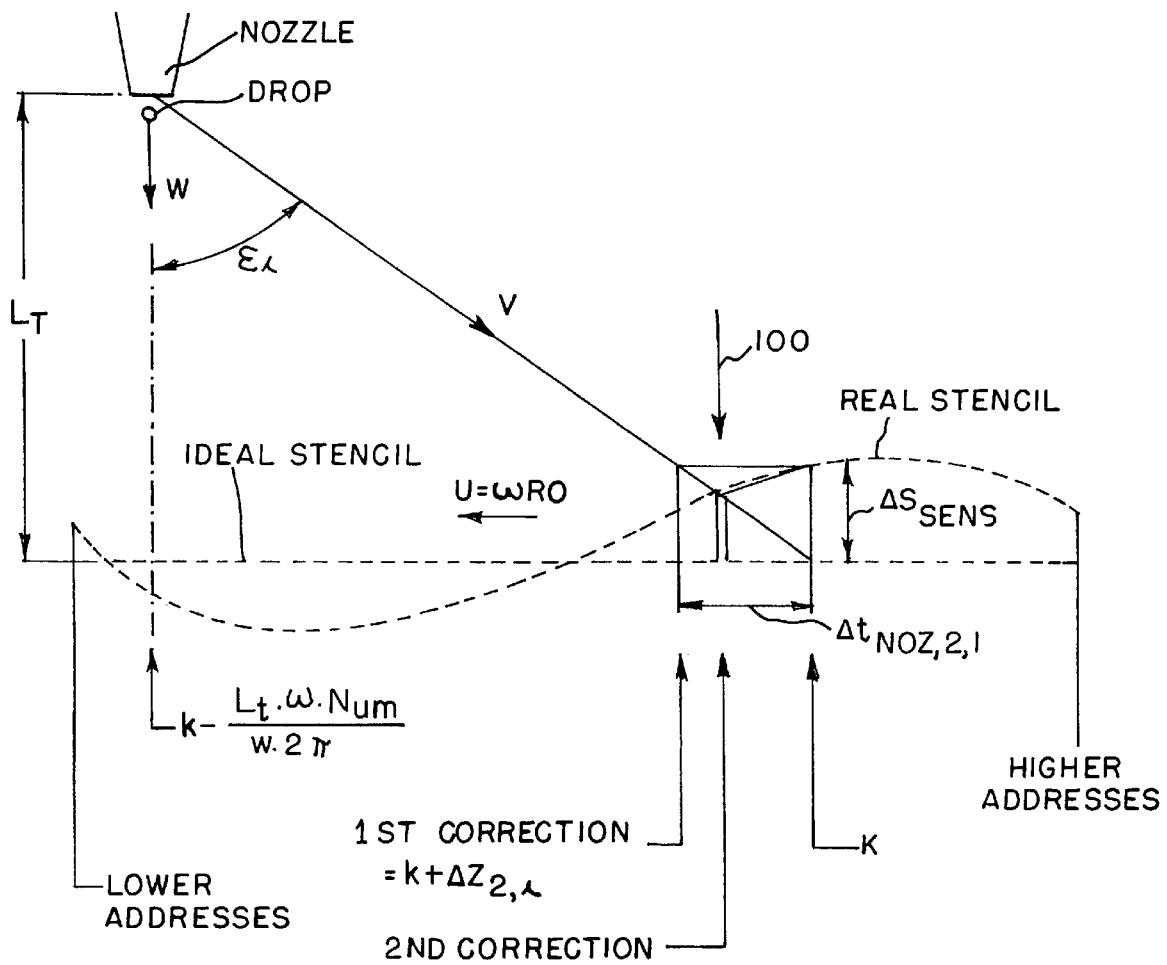
FIG. 3 shows a representation for explaining the relative movement between sprayed-on liquid drop and the stencil cylinder circumference.

An address correction likewise has to be formed for compensating the incorrect circumferential position of the second type. The decisive question is where the drop ejected from the nozzle will impinge on the stencil surface. Reference is made to FIG. 3 to answer this question.

So that the drop impinges on an ideal stencil, that is to say a stencil without any radial eccentricity, at the point which is to be assigned to the address k, the drop must already be ejected when the stencil point with the address $$k = \frac{L_T \cdot \omega \cdot N_{um}}{w \cdot 2 \cdot \pi}$$

is precisely opposite the nozzle. This holds if the stencil rotates at a circumferential speed u and the drop leaves the nozzle at the speed w. The drop then has the relative speed v with respect to the stencil.

The address 100 the drop impinges on the real stencil is best gathered from the drawing (FIG. 3). If the distance error $\Delta s_{sens}$ of the real stencil were not to change at all, or only slightly, the required correction would then correspond to the circumferential section $\Delta t_{noz,2,1}$, and this is obtained from the proportion $$\Delta t_{noz,2,1}(k) / \Delta s_{Sens}(k) = w/u.$$

A first part of the address correction for the incorrect circumferential position of the second type is then yielded from $\Delta t_{noz,2,1}(k)$ by converting the section into the number of pulses it contains:

$$\Delta z_{2,1}(k) = -\Delta t_{noz,2,1}(k) \cdot \frac{N_{um}}{2 \cdot \pi \cdot R_0} = -\Delta s_{Sens}(k) \cdot \frac{w}{u} \cdot \frac{N_{um}}{2 \cdot \pi \cdot R_0} \quad (19)$$

Figure 4:
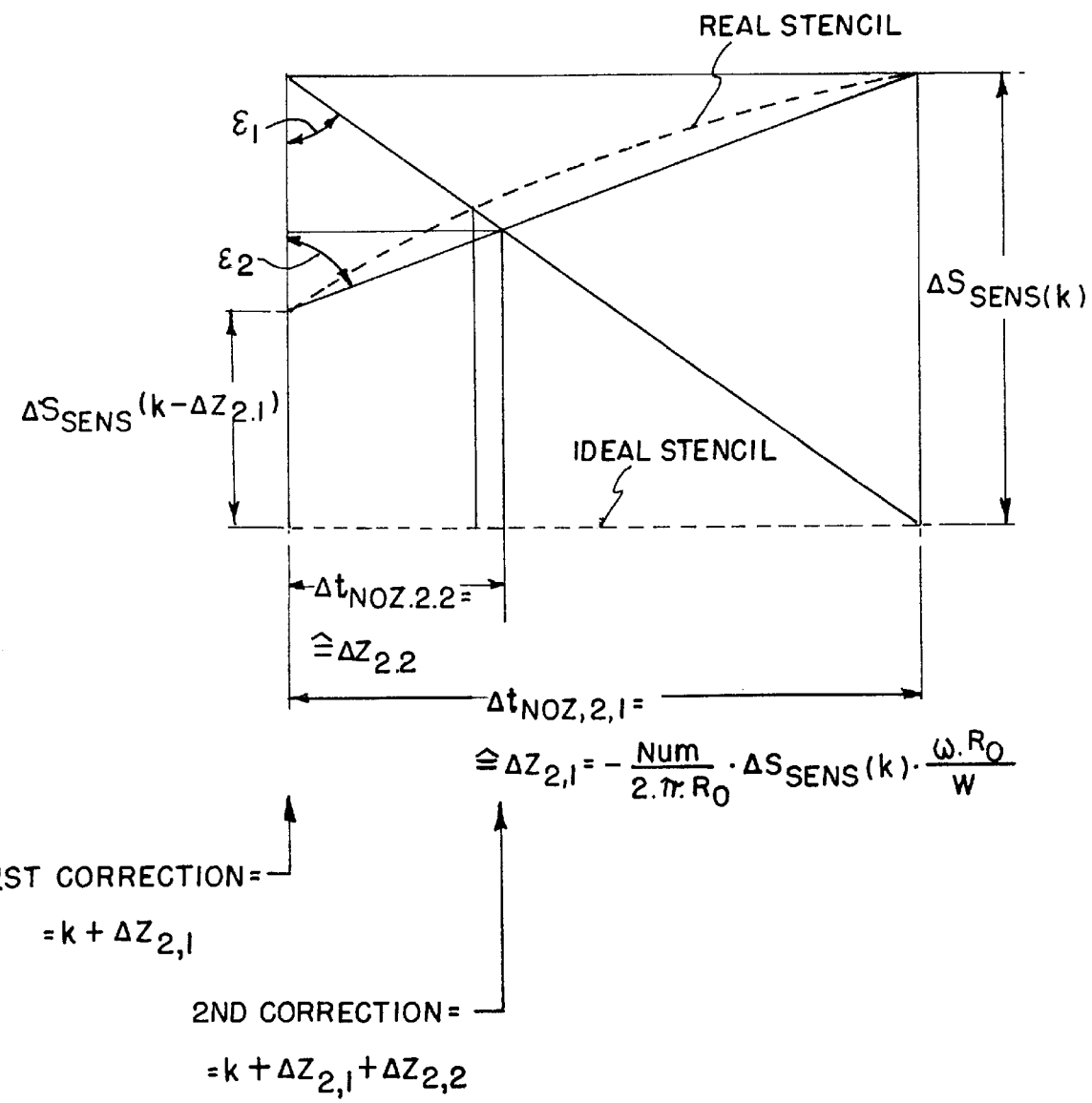
FIG. 4 shows a further sketch for calculating the correction of radial eccentricities.

In the case of stronger changes in the radial eccentricity in the surroundings of the point of impingement, however, the correction is still too inaccurate. FIG. 4 shows how a further improvement can be achieved. In essence, this is done by linearizing the characteristic of the distance error in the surroundings of the point where the drop impinges on the stencil.

$$\Delta z_{2,2}(k) = \quad (20)$$
$$\frac{\Delta s_{Sens}(k) - \Delta s_{Sens}(k - \Delta z_{2,1}(k))}{2 \cdot \Delta s_{Sens}(k) - \Delta s_{Sens}(k - \Delta z_{2,1}(k))} \cdot \Delta t_{noz,2} \cdot \frac{N_{um}}{2 \cdot \pi \cdot R_0}$$

In conclusion, it follows for the final correction that $$\Delta z_2(k) = \Delta z_{2,1}(k) + \Delta z_{2,2}(k)$$

and this results in $$\Delta z_2 \langle k+N_r \rangle = \quad (21)$$
$$-\frac{(\Delta s_{Sens}(k))^2}{2 \cdot \Delta s_{Sens}(k) - \Delta s_{Sens}(k - \Delta z_{2,1}(k))} \cdot \frac{w}{u} \cdot \frac{N}{2 \cdot \pi \cdot R_0}$$

by making use of (19) and (20).

In the case now at hand, the rules to be applied for avoiding engraving errors are:

In the case of the k-th incoming encoder pulse form the address correction value $\Delta z_1(k)$ in accordance with the relationships (17) and (18), and store the value in a memory location $\Delta z_1(k)$. Clear the value in the case of the $\langle k+N_\Gamma \rangle$-th pulse.

In the case of the k-th incoming encoder pulse, form the value $\Delta z_2(k)$ in accordance with the relationships (19) to (21), and store this value in a memory location $\Delta z_2(k)$. Clear this value, as well, in the case of the $\langle k+N_\Gamma \rangle$-th pulse.

Add the two address correction values $\Delta z_1$ and $\Delta z_2$ to the address k, that is to say form $k+\Delta z_1+\Delta z_2$, and clear from this address of the pattern memory that item of pattern information in accordance with which the stencil is to be engraved, in order to compensate the incorrect pattern position which would otherwise be produced by the radial eccentricity.

It holds further in connection with FIG. 4 that $$\tan(\varepsilon_1) = \frac{\Delta t_{noz,2,1}}{\Delta s_{Sens}(k)} \quad (21a)$$

$$\tan(\varepsilon_2) = \frac{\Delta t_{noz,2,1}}{\Delta s_{Sens}(k) - \Delta s_{Sens}(k + \Delta z_{2,1})} \quad (21b)$$

$$\frac{\Delta t_{noz,2,2}}{\tan(\varepsilon_1)} + \frac{\Delta t_{noz,2,2}}{\tan(\varepsilon_2)} = \Delta s_{Sens}(k) - \Delta s_{Sens}(k + \Delta z_{2,1}) \quad (21c)$$

It follows from this that:

$$\Delta t_{noz,2,2} = \frac{\Delta s_{Sens}(k) - \Delta s_{Sens}(k + \Delta z_{2,1})}{2.\Delta s_{Sens}(k) - \Delta s_{Sens}(k + \Delta z_{2,1})} \cdot \Delta t_{noz,2,1} \quad (21d)$$

$$= \frac{\Delta s_{Sens}(k) - \Delta s_{Sens}(k + \Delta z_{2,1})}{2.\Delta s_{Sens}(k) - \Delta s_{Sens}(k + \Delta z_{2,1})} \cdot \Delta s_{Sens}(k) \cdot \frac{\omega.R_0}{w}$$

$$\Delta z_{2,2} = \Delta t_{noz,2,2} \cdot \frac{N_{um}}{2.\pi.R_0} \quad (21e)$$

III. Measuring and processing the radial eccentricity in the case of an unpressurized stencil which is excited by faults to vibrations of the thin hollow cylinder envelope The last case to be considered is a stencil to which a pressure is not applied on its inside, and which is excited to vibrations by temporally varying external forces. In this case, a first ranging sensor (still further sensors have to be introduced later) measures a distance for the time-dependent changes in which two different causes are decisive. The first cause is the static radial eccentricity. This is present as a function $R(\chi)$ over the circumference of the stencil and is defined by equation (4). The angle $\chi$ is measured starting from a zero mark provided on the stencil circumference, specifically in a polar coordinate system which is permanently connected to the stencil and whose origin lies on the stencil axis. This angle is to be counted positively in that direction which opposes the direction of rotation. Since the stencil rotates at the angular velocity $\omega$, the static radial eccentricities move past the sensor at the circumferential speed $R\cdot\omega$. Furthermore, an angular position $\phi$ of the stencil is to be defined with respect to the position of the first sensor, specifically most effectively by measuring this angle between the zero mark and the first sensor.

It then holds for $\phi$ $$\phi = \omega \cdot t \quad (22)$$

This relationship also defines the instant $t=0$. The latter is determined owing to the fact that the zero mark moves precisely past the position of the first sensor. The distance changes previously described have superimposed on them distance variations which are to be ascribed to the vibration of the stencil, and this is the second cause for the time-variable distances measured by the sensor. The time dependency of this second component of the distance change is also the reason which prompts including the time t in the considerations here.

In order not to complicate the relationships excessively, it is to be assumed that the thin stencil vibrates at only one frequency. Moreover, the maximum value of the amplitude of vibration is to remain constant during the observation period. This case will be the most important case in practice, because it is to be assumed that the excitation of vibration is caused by the rotary movement of the stencil and that the vibration frequency therefore corresponds to the rotational speed or a multiple thereof. The ever present material damping effects a stationary vibration state after a short settling time. It is therefore necessary to add a further vibration component to the distance changes on the basis of the static radial eccentricities (relationships (4), (5)). It then holds for the radial eccentricity measured by a first sensor that:

$$s_{sens,1}(\varphi) = A - R_0 - \sum_{i=1}^{N_{um}/2} [a_i \cdot \cos(i \cdot \varphi) + b_i \cdot \sin(i \cdot \varphi)] + \quad (23)$$

$$c_{dyn} \cdot \sin(n \cdot \varphi + \Phi) \cdot \cos(\kappa \cdot t + \theta)$$

The term $$c_{dyn} \cdot \sin(n \cdot \phi + \Phi) \cdot \cos(\kappa \cdot t + \theta) \quad (24)$$

added to the relationship (5) consists, as is known in the case of vibrating continua, of three factors, specifically an amplitude $c_{dyn}$ of the position function $\sin(n \cdot \phi + \Phi)$ and the time-dependent function $\cos(k \cdot t + \Phi)$. Here, $c_{dyn}$ signifies the maximum amplitude of vibration of the stencil, that is to say the amplitude at the points of the antinodes. The number of antinodes n along the circumference of the stencil is generally also designated as the order or suborder of the vibration. The unknown angular distance $\Phi$ is between the nearest node on the stencil and the zero mark. The unknown time interval $T_0$ of the last maximum amplitude of the vibration from the instant $t=0$ is converted into a phase angle $\theta$, and it holds that $\theta = T_0 \cdot \kappa$. Finally, $\kappa$ signifies the angular frequency of the vibration.

It is expedient for understanding the additive term (24) to adopt an observation standpoint fixed in the sensor and to regard the vibration picture of the stencil (that is to say, its antinodes and nodes) in its circumferential position as if it were permanently connected to the remaining form errors of the stencil. However, in contrast to the static form errors, whose size does not vary with time, the antinodes pulsate in time with the vibration frequency and at the same time this pulsating feature moves past the sensor when the stencil rotates. Yet a further remark on the order n of the vibration. This order n refers to the number of antinodes on the circumference of the stencil; the number of antinodes in the axial direction is of no interest here.

For $n=1$ only a single antinode occurs on the circumference and rotates with the stencil. This corresponds to a flexural vibration of the stencil, such as can be observed, for example, in the vicinity of a critical speed. It is known from mechanics that the antinode rotates with the rotation of the shaft in the case of flexural vibration, as well.

For $n=2$, the stencil vibrates in such a way that an oval is formed as vibrational form, and for $n=3$ the vibrational form is a triangle. If the stencil vibrates at $n=2$ as an oval, an observer rotating with the stencil system would see a ring which has the larger diameter now in one direction and, in the next half period, in the direction perpendicular thereto. Of course, a ranging sensor measures only a temporally variable distance to this rotating and simultaneously vibrating feature. Generally, the stencil must not have maximum deflection precisely when the antinode passes by the sensor. For this reason, it may be expected that it is not possible to use a single sensor to detect the vibration state of the stencil, and certainly not possible to separate said state from the form errors. The same conclusion can also be reached by considering the relationship (23). Although after a measurement of a complete stencil circumference there are $N_{um}$ measured values available, it is necessary to use these to determine the $N_{um}$ coefficients $a_i$ and $b_i$ ($i=0, 1, \ldots, N_{um}/2$) of the Fourier series terms in (23). There are then no more conditional equations remaining to determine the unknown parameters of the dynamic term (24).

Figure 5:
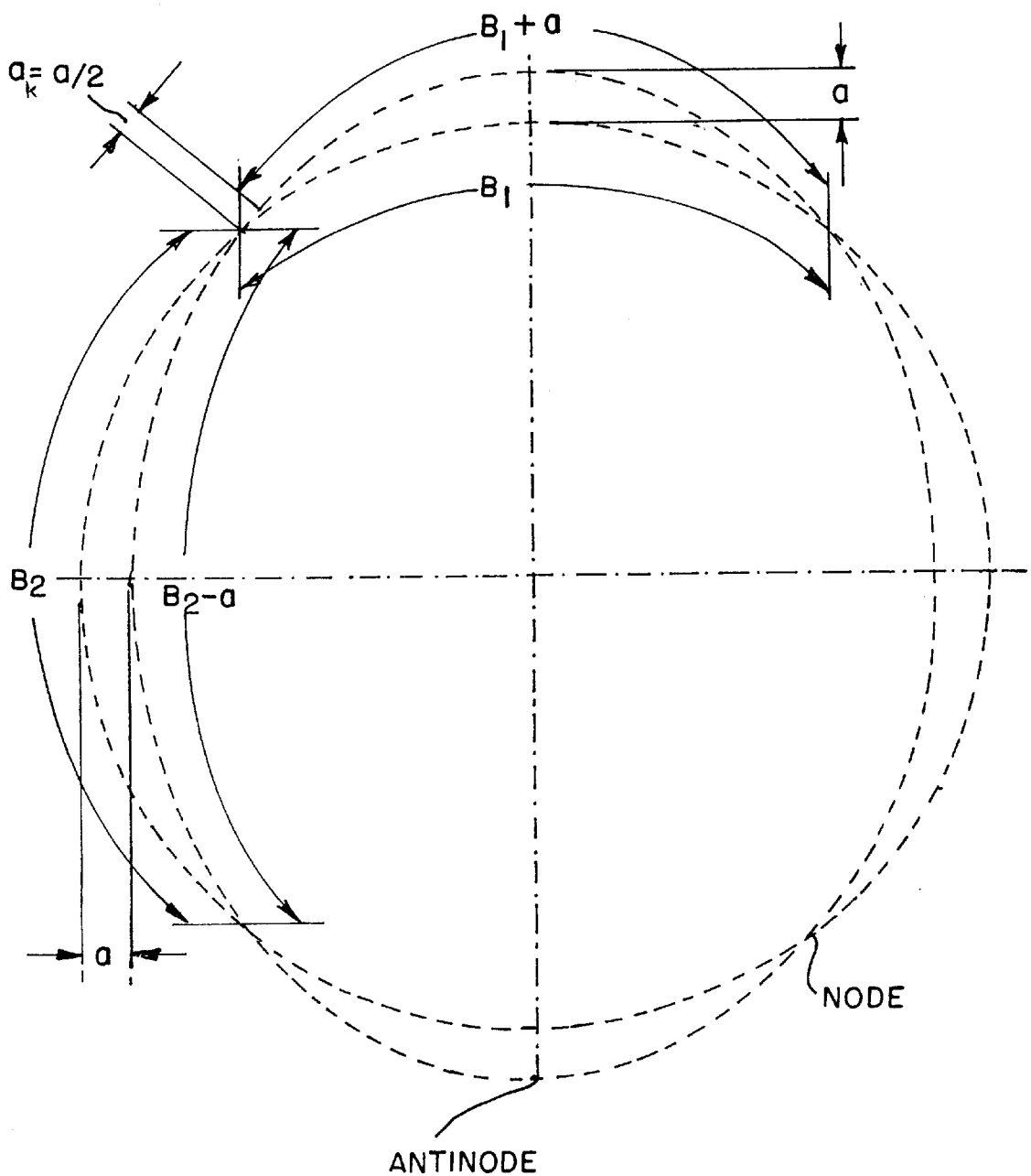
FIG. 5 shows a sketch for illustrating the position of nodes and antinodes in the case of a thin-walled hollow cylinder.

The aim is therefore to arrange a second sensor at an angle α to the first sensor, which detects the distances from the stencil wall in accordance with the relationship (23). An observer B2 positioned on this sensor would see the same vibrating stencil, that is to say the errors thereof, antinodes and nodes as an observer B1 on the first sensor (FIG. 5). It is now to be assumed that at an arbitrary instant t during a rotation the observer B1 makes a recording of the instantaneous state of the stencil and records the angular distances from the antinodes and the nodes. If the observer B2 were likewise to measure the instantaneous state of the stencil at the same instant, he would admittedly establish the same amplitudes of the antinodes, but different relative angular positions to his position. Specifically, the latter differ by the angle α from the instantaneous recording of the observer B1. However, if the observer B2 waits for that time interval Δt=α/ω which the stencil requires in order to rotate precisely by the angle α, the observer B2 sees the same relative instantaneous positions of the antinodes and nodes, but different instantaneous values of the amplitudes of vibration. The latter are yielded corresponding to the relationship (24) at the later instant $$t+\Delta t = t+\alpha/\omega \text{ as } c_{dyn} \cdot \sin(n\cdot\phi+\Phi) \cos(\kappa\cdot(t-\alpha/\omega)+\theta) \tag{26}$$

The relationship (23) held for the distance of the first sensor from the stencil wall at the instant t, and the relationship $$s_{sens,2}(\varphi) = \frac{A - R_0}{s_0} - \sum_{i=1}^{N_{um}/2} [a_i \cdot \cos(i\cdot\varphi) + b_i \cdot \sin(i\cdot\varphi)] + \tag{27}$$

$$c_{dyn} \cdot \sin(n\cdot\varphi + \Phi) \cdot \cos(\kappa \cdot (1 + \alpha/\omega) + \theta)$$

holds correspondingly for the distance of the second sensor from the stencil wall in a completely analogous way, but at the later instant t+α/ω.

In (27), φ once again denotes the same angle of rotation of the stencil as in (23). The relationships (23) and (27) are used to elaborate those equations which are required in order to consider whether it is already possible with the aid of the measurement results of two sensors to forecast accurately the distances of the stencil wall from an arbitrary observer or component, for example the optical system. This observer is to be permanently connected to a sensor system, but to adopt an arbitrarily prescribed angle to this system at the periphery of the rotating stencil.

The relationships (23) and (27) are written down once again, but with the aid of a suitable notation the left-hand side is more effectively stressed, so that we are dealing with two different distances which are measured by two different sensors at two different instants.

$$\Delta s_{sens,1}(t) = a_0 + \sum_{i=1}^{N_{um}/2} [a_i \cdot \cos(i\cdot\varphi) + b_i \cdot \sin(i\cdot\varphi)] + \tag{23a}$$

$$c_{dyn} \cdot \sin(n\cdot\varphi + \Phi) \cdot \cos(\kappa \cdot t + \theta)$$

$$\Delta s_{sens,2}(t + \Delta t) = a_0 + \sum_{i=1}^{N_{um}/2} [a_i \cdot \cos(i\cdot\varphi) + b_i \cdot \sin(i\cdot\varphi)] + \tag{27a}$$

$$c_{dyn} \cdot \sin(n\cdot\varphi + \Phi) \cdot \cos(\kappa \cdot (t + \alpha/\omega) + \theta)$$

If the difference between these measurement results is now formed, and the angular coordinate φ is introduced in accordance with (22) instead of time (t=φ/ω), the static error components are eliminated by subtraction, and the following is obtained for the difference signal $$D_{21} = \Delta s_{sens,1}(t) - \Delta s_{sens,2}(t + \Delta t) \tag{28}$$

$$= c_{dyn} \cdot \sin(n\cdot\varphi + \Phi) \cdot$$

$$\left[\cos\left(\varphi \cdot \frac{\kappa}{\omega} + \theta\right) - \cos\left(\varphi \cdot \frac{\kappa}{\omega} + \alpha \cdot \frac{\kappa}{\omega} + \theta\right)\right]$$

An attempt must now be made to determine the parameters of this relationship which characterize the dynamic error component. In order to display more effectively the physical import of the relationship (28), two auxiliary variables ε and η are formed for which it is to hold that $$\cos(\varepsilon) = \eta \cdot \left[1 - \cos\left(\frac{\kappa}{\omega} \cdot \alpha\right)\right] \tag{29a}$$

and $$\sin(\varepsilon) = \eta \cdot \sin\left(\frac{\kappa}{\omega} \cdot \alpha\right) \tag{29b}$$

It then follows from (28) that $$D_{21} = \frac{c_{dyn} \cdot \eta}{2} \cdot \tag{30}$$

$$\left\{\sin\left[\left(n - \frac{\kappa}{\omega}\right)\cdot\varphi + \Phi - (\theta - \varepsilon)\right] + \sin\left[\left(n + \frac{\kappa}{\omega}\right)\cdot\varphi + \Phi + (\theta - \varepsilon)\right]\right\}$$

and it is to be seen from this form of the difference between the two sensor signals that it is composed of two sine signals having an amplitude of the same size but being of different frequencies, that is to say corresponds to beating. The unknown parameters in the relationship (30) and, of course, also in (28) are the variables $c_{dyn}$, κ, ω, θ, n and Φ. The auxiliary variables ε and η, by contrast, can be ascribed to κ, ω and the known angular distance α between the first and second sensors. It holds that $$\varepsilon = \arctan\left(\frac{\sin\left(\frac{\kappa}{\omega} \cdot \alpha\right)}{1 - \cos\left(\frac{\kappa}{\omega} \cdot \alpha\right)}\right) \tag{31a}$$

and $$\eta = \frac{1}{\sqrt{2 \cdot \left[1 - \cos\left(\frac{\kappa}{\omega} \cdot \alpha\right)\right]}} \tag{31b}$$

It is also possible to find a direct functional relationship for (31a) and (31b) by eliminating the parameter κ/ω·α. Recourse will be made to this later.

$$\eta = \frac{1}{2 \cdot \cos(\varepsilon)} \tag{31c}$$

$$\varepsilon = \arccos\left(\frac{1}{2 \cdot \eta}\right) \tag{31d}$$

The special form of the difference signal described by the equation (30) suggests it is expedient to write down this equation in a form which permits simple comparison with a Fourier series.

For this purpose, $$D_{21} = \frac{c_{dyn} \cdot \eta}{2} \cdot \{\sin[(n - \frac{\kappa}{\omega}) \cdot \varphi] \cdot \cos[\Phi - (\theta - \varepsilon)] + \cos[(n - \frac{\kappa}{\omega}) \cdot \varphi] \cdot \sin[\Phi - (\theta - \varepsilon)]\} + \frac{c_{dyn} \cdot \eta}{2} \cdot \{\sin[(n + \frac{\kappa}{\omega}) \cdot \varphi] \cdot \cos[\Phi + (\theta - \varepsilon)] + \cos[(n + \frac{\kappa}{\omega}) \cdot \varphi] \cdot \sin[\Phi + (\theta - \varepsilon)]\} \quad (32)$$

is formed, $$a_{low} = \frac{c_{dyn} \cdot \eta}{2} \cdot \sin[\Phi - (\theta - \varepsilon)] \quad b_{low} = \frac{c_{dyn} \cdot \eta}{2} \cdot \cos[\Phi - (\theta - \varepsilon)] \quad (33)$$

$$a_{high} = \frac{c_{dyn} \cdot \eta}{2} \cdot \sin[\Phi + (\theta - \varepsilon)] \quad b_{high} = \frac{c_{dyn} \cdot \eta}{2} \cdot \cos[\Phi + (\theta + \varepsilon)]$$

is substituted therein, and $$D_{21} = a_{low} \cdot \cos[(n - \frac{\kappa}{\omega}) \cdot \varphi] + b_{low} \sin[(n - \frac{\kappa}{\omega}) \cdot \varphi] + a_{high} \cos[(n + \frac{\kappa}{\omega}) \cdot \varphi] + b_{high} \sin[(n + \frac{\kappa}{\omega}) \cdot \varphi] \quad (34)$$

is obtained in the desired Fourier form. It is seen that only two terms of this series stand out. The first of these terms is that of order n−κ/ω. This can be of zeroth order if n−κ/ω=0. The quotient κ/ω is formed from κ the angular frequency of the membrane vibration and from the angular velocity ω of the stencil. Since the vibration is excited by the rotary movement of the stencil, only integral ratios κ/ω occur, and the orders n−κ/ω and n+κ/ω then likewise remain integral.

If the values of the coefficients $a_{low}$, $b_{low}$, $a_{high}$ and $b_{high}$ were known in conjunction with the parameters n, κ and ω in the relationship (32), it would be possible to determine the value of the difference signal $D_{21}$ for each arbitrary angle φ. Although, unfortunately, coefficients and parameters are not known, the value $D_{21} = \Delta s_{sens,1} - \Delta s_{sens,2}$ stored for in each case one rotation are available. These can be used to recalculate the coefficients $a_{low}, \ldots, b_{high}$, for example using the known method of fast Fourier transformation (FFT). Once the coefficients have been determined, the four equation [sic] (31) are available for the purpose of calculating further unknowns of the six parameters $c_{dyn}$, ε, η, Φ, n and θ. Apart from the coefficients mentioned, in the case of the FFT, the orders of these coefficients also occur, that is to say $$O1 = n - \kappa/\omega \quad (34a)$$

$$O2 = n + \kappa/\omega \quad (34b)$$

because the coefficients of all other orders vanish.

The value of Φ can be determined very simply:

$$a_{low} = \frac{c_{dyn} \cdot \eta}{2} \cdot [\sin(\Phi) \cdot \cos(\theta - \varepsilon) - \sin(\theta - \varepsilon) \cdot \cos(\Phi)]$$

$$a_{high} = \frac{c_{dyn} \cdot \eta}{2} \cdot [\sin(\Phi) \cdot \cos(\theta - \varepsilon) + \sin(\theta - \varepsilon) \cdot \cos(\Phi)]$$

Adding the two last expressions $$a_{low} + a_{high} = c_{dyn} \cdot \eta \cdot \sin(\Phi) \cdot \cos(\theta - \varepsilon); \quad (35)$$

is obtained; it follows analogously that:

$$b_{low} + b_{high} = c_{dyn} \cdot \eta \cdot \cos(\Phi) \cdot \cos(\theta - \varepsilon) \quad (36)$$

and, finally, from (33) and (34) that $$\Phi = \arctan\left(\frac{a_{low} + a_{high}}{b_{low} + b_{high}}\right) \quad (37)$$

It may be shown, furthermore, that $$\theta - \varepsilon = \frac{1}{2} \cdot \left[\arctan\left(\frac{a_{high}}{b_{high}}\right) - \arctan\left(\frac{a_{low}}{b_{low}}\right)\right] \quad (38)$$

holds for the difference θ−ε.

The value α·κK/ω can be eliminated from equations (29a) and (29b) and the following is obtained for ε as a function of η:

$$\varepsilon = \arctan\left(\frac{1}{2 \cdot \eta}\right) \quad (39)$$

Finally, it can be shown with the aid of (32) that $$\frac{c_{dyn}^2 \cdot \eta^2}{4} = a_{low}^2 + b_{low}^2 = a_{high}^2 + b_{high}^2 \quad (40)$$

must hold.

The expressions (38), (39) and (40) represent three equations for determining the four unknowns θ, ε, η and $c_{dyn}$. The system of equations is therefore not sufficiently determined and no solution is yet possible. This could already have been realized from (34), because this system of equations was already underdetermined and, in addition, the variables Φ and ε and likewise the variables $c_{dyn}$ and η always occurred in the same combination in (34).

A solution of the present problem therefore requires the mounting of a third ranging sensor which is offset relative to the first ranging sensor by the installation angle β, there being a requirement that β≠α. Only with the measured values additionally supplied by this third sensor will it become possible to determine all the variables required to determine the stencil vibration, and in this way to separate the radial eccentricities as a consequence of vibration from the static radial eccentricities. This is necessary because the calculation of the radial and tangential positionally errors at the location where the liquid is applied can only be performed separately for the static eccentricity and the vibrational deviation.

However, another transformation of the relationship (40) is required as a first step. From (40) it follows, if η is replaced by (31b) and it is considered that $1 - \cos(x) = 2 \cdot \sin^2(x/2)$, that $$a_{low}^2 + b_{low}^2 = a_{high}^2 + b_{high}^2 = \quad (41)$$

$$\frac{c_{dyn}^2 \cdot \eta^2}{4} = \frac{c_{dyn}^2}{4} \cdot \frac{1}{2 \cdot [1 - \cos(\frac{\kappa}{\omega}) \cdot \alpha]} = \frac{c_{dyn}^2}{16 \cdot \sin^2(\frac{1}{2} \cdot \frac{\kappa}{\omega} \cdot \alpha)}$$

In a manner entirely similar to how it was demonstrated previously for the difference signal for the second and first sensors, the result for the difference signal between the third and first sensors is obtained, instead of (34), as $$D_{31} = \Delta s_{sens,1}(t) - \Delta s_{sens,3}(t + \Delta \bar{t}) = \quad (42)$$

$$\bar{a}_{low} \cdot \cos\left[\left(n - \frac{\kappa}{\omega}\right) \cdot \varphi\right] + \bar{b}_{low} \cdot \sin\left[\left(n - \frac{\kappa}{\omega}\right) \cdot \varphi\right] +$$

$$\bar{a}_{high} \cdot \cos\left[\left(n + \frac{\kappa}{\omega}\right) \cdot \varphi\right] + \bar{b}_{high} \cdot \sin\left[\left(n + \frac{\kappa}{\omega}\right) \cdot \varphi\right]$$

Values $\bar{a}_{low}$, $\bar{b}_{low}$, $\bar{a}_{high}$ and $\bar{b}_{high}$ are calculated, in a similar way as already done earlier for the coefficients $a_{low}$, $b_{low}$, $a_{high}$ and $b_{high}$, with the aid of an FFT of the value sequence, determined by measurement, for $D_{31}$. It holds for these values by analogy with (39) that:

$$\bar{a}_{low}^2 + \bar{b}_{low}^2 = \bar{a}_{high}^2 + \bar{b}_{high}^2 = \quad (43)$$

$$\frac{c_{dyn}^2 \cdot \eta^2}{4} = \frac{c_{dyn}^2}{4} \cdot \frac{1}{2 \cdot \left[1 - \cos\left(\frac{\kappa}{\omega} \cdot \beta\right)\right]} = \frac{c_{dyn}^2}{16 \cdot \sin^2\left(\frac{1}{2} \cdot \frac{\kappa}{\omega} \cdot \beta\right)}$$

It may be recalled that $c_{dyn}$ is the maximum amplitude of vibration of the stencil at its circumferential antinodes. The amplitude therefore does not depend on the position of a sensor. If $\beta = 2\alpha$ is now further chosen, it follows from (41) and (43) that:

$$\frac{\sin^2\left(\frac{1}{2} \cdot \frac{\kappa}{\omega} \cdot 2 \cdot \alpha\right)}{\sin^2\left(\frac{1}{2} \cdot \frac{\kappa}{\omega} \cdot \alpha\right)} = \frac{a_{low}^2 + b_{low}^2}{\bar{a}_{low}^2 + \bar{b}_{low}^2}$$

and, further, that $$\frac{\sin\left(\frac{1}{2} \cdot \frac{\kappa}{\omega} \cdot 2 \cdot \alpha\right)}{\sin\left(\frac{1}{2} \cdot \frac{\kappa}{\omega} \cdot \alpha\right)} =$$

$$\frac{2 \cdot \sin\left(\frac{1}{2} \cdot \frac{\kappa}{\omega} \cdot \alpha\right) \cdot \cos\left(\frac{1}{2} \cdot \frac{\kappa}{\omega} \cdot \alpha\right)}{\sin\left(\frac{1}{2} \cdot \frac{\kappa}{\omega} \cdot \alpha\right)} = 2 \cdot \cos\left(\frac{1}{2} \cdot \frac{\kappa}{\omega} \cdot \alpha\right) = \sqrt{\frac{a_{low}^2 + b_{low}^2}{\bar{a}_{low}^2 + \bar{b}_{low}^2}}$$

and finally $$\frac{\kappa}{\omega} = 2 \cdot \arccos\left(\frac{1}{2} \cdot \sqrt{\frac{a_{low}^2 + b_{low}^2}{\bar{a}_{low}^2 + \bar{b}_{low}^2}}\right) / \alpha \quad (44)$$

is obtained.

This relationship is the key to the further evaluations, and now finally permits the determination of $\kappa/\omega$. If this value is known, it is possible to draw conclusions on the variable $\epsilon$ by means of (31a), and on the value of $\eta$ by means of (31b). The variable $\Phi$ follows from (38) with a known $\epsilon$ and, finally, the value of $c_{dyn}$ follows from (40) with a known $\eta$. It is also possible to determine the number of antinodes n (=order of the vibration) from (34a) or (34b). All the parameters which were placed as known in the vibration component of the relationship (23) are now determined.

The values $s_{Sens,1}(\phi)$ measured by the first sensor during a rotation can therefore be freed from their vibration component (24). The correct determination of $\phi$ and t is to be borne in mind here. In the position function $\sin(n \cdot \phi + \Phi)$ of the vibration component (24), $\phi$ denotes the angle between the zero mark and the first sensor at the measuring instant t. The result for the distance from the stencil wall to the sensor which is freed from the dynamic component is $$s_{sens,1,static}(\varphi) = s_{sens,1}(\varphi) - c_{dyn} \cdot \sin(n \cdot \varphi + \Phi) \cdot \cos\left(\frac{\kappa}{\omega} \cdot \varphi + \theta\right) \quad (45)$$

$$= \underbrace{A - R_0}_{s_0} - \sum_{i=1}^{N_{um}/2} [a_i \cdot \cos(i \cdot \varphi) + b_i \cdot \sin(i \cdot \varphi)]$$

Consequently, it follows for the static part of the difference of the measured distances from the sensor to the ideal stencil and from the sensor to the real stencil $\Delta s_{sens,1,static} = s_0 - s_{sens,1,static}(\phi)$ that $$\Delta s_{sens,1,static}(\varphi) = s_0 - s_{sens,1}(\varphi) + c_{dyn} \cdot \sin(n \cdot \varphi + \Phi) \cdot \cos\left(\frac{\kappa}{\omega} \cdot \varphi + \theta\right) \quad (47)$$

The further calculation can be better surveyed if $\phi$ in (47) is replaced by the number of encoder pulses which are counted starting with the zero pulse. It then follows that $$\Delta s_{sens,1,static}(k) = \quad (48)$$

$$s_0 - s_{sens,1}(k) + c_{dyn} \cdot \sin\left(n \cdot \frac{k}{N_{um}} 2 \cdot \pi + \Phi\right) \cdot \cos\left(\frac{\kappa}{\omega} \cdot \frac{k}{N_{um}} 2 \cdot \pi + \theta\right)$$

and this value $\Delta s_{sens,1,static}$ is stored at the memory location k of its measured value sequence. If the stencil position measured by the sensor is located at the engraving point—a further $N_\Gamma$ (see relationship (9)) pulses have then elapsed—this value is cleared, in order to correct the vibration component valid at the instant when the drop impinges on the stencil wall and to determine from this value the radial displacement of the stencil to be taken into account. This state of affairs is described as follows with the aid of the symbolic system already used earlier:

$$\Delta s_{engrav}\langle k + N_\Gamma \rangle = \quad (49)$$

$$\Delta s_{Sens,1,static}\langle k \rangle - c_{dyn} \cdot \sin\left(n \cdot \frac{k}{N_{um}} \cdot 2 \cdot \pi\right) \cdot \cos\left(\frac{\kappa}{\omega} \cdot \frac{k + N_{\Gamma 1}}{N_{um}} \cdot 2 \cdot \pi + \theta\right)$$

It is not, for example, the value according to the relationship (9) which is to be substituted in this relationship for the number $N_{\Gamma 1}$ of pulses, but that number of pulses which the encoder emits while a point on the stencil wall moves from the location of the sensor up to the engraving point, and this is:

$$N_{\Gamma 1} = N_{um} \cdot \Gamma / (2 \cdot \pi) \quad (49a)$$

To calculate the displacement of the stencil wall in the circumferential direction, it is necessary to select a starting point at which the wall is not displaced in the circumferential direction. It therefore has to be clarified whether there is on the stencil an envelope generatrix which does not experience any displacement in the circumferential direction at any point. FIG. 5 shows a circular cylindrical stencil which is in a state of rest and vibrates in the form of an oval. Given thin stencils or thin hollow cylinders, the positive and negative maximum deflections are equal at all points on the circumference, given small amplitudes of vibration.

Consideration is to be given at first only to vibrational deflections which are to be observed in directions normal to the cross-sectional circle of the stencil (in the state of rest). When this is done, points are then detected at which the stencil apparently experiences maximum deflections, and also points at which, apparently, no deflections are to be seen. The first named points are to be designated as antinodes, and the last mentioned as nodes, although this notation is not correct if consideration is also given to the amplitudes of vibration in the circumferential direction. However, the latter can be detected only with difficulty in the case of visual inspection. Specifically, it follows from a computational estimation of the arc lengths between the "nodes" thus defined that firstly, compared with the other points on the stencil surface, the circumferential point which has so far been regarded as a node experiences a maximum deflection in the circumferential direction;

secondly, in terms of absolute value these deflections are half as large as the deflections of the stencil wall in the direction of the normal to the "antinodes";

and thirdly, for reasons of symmetry, the deflections in the circumferential direction must vanish at the antinodes.

An envelope generatrix of the stencil envelope, which extends through an antinode, thus experiences no deflection in the circumferential direction, and is therefore very particularly suitable as the origin for calculating the geometrical displacement of the stencil wall in the circumferential direction in the case of vibrating stencils.

It is characteristic of the antinodes defined here, at which the normal deflections reach maximum values, that the position function $$\sin(2 \cdot n \cdot k_B \cdot \pi / \text{Num [sic]} + \Phi)$$

in (23) assumes the value 1.

It follows from this that $$n \cdot \frac{k_B}{N_{um}} 2 \cdot \pi + \Phi = \frac{\pi}{2} \quad (50)$$

and the pulse number $k_B$=(pulse number from the zero mark up to the first antinode position) corresponding to the antinode position thus becomes $$k_B = \left(\frac{\pi}{2} - \Phi\right) \frac{N_{um}}{2 \cdot n \cdot \pi} \quad (51)$$

Figure 6:
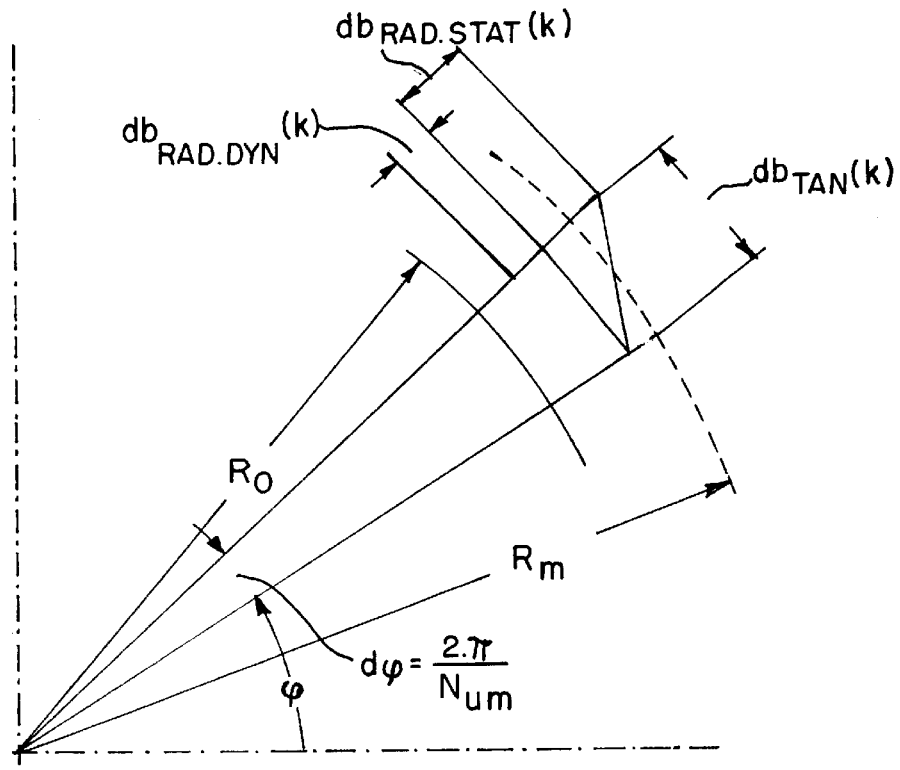
FIG. 6 shows a sketch for illustrating static and dynamic error components.

The next calculation step consists in determining the circumferential sublengths db(k) of the stencil between in each case two measuring points, and to sum these, starting from the position of the antinode, up to the engraving point, in order to obtain the arc length of this partial circumference of the stencil. It is then necessary to use the partial circumference to form the difference relative to the corresponding partial circumference of the ideal stencil, and this is the displacement of the stencil wall in the circumferential direction. The sublengths db(k) are to be geometrically composed, as already earlier, from radial and tangential segments. The radial segments consist here of a static and a dynamic error component. The result for the static error component of the radial segment (FIG. 6) is $$db_{rad,\,stat}(k) = \Delta s_{sens,1,static}(k) - \Delta s_{sens,1,static}(k+1) \quad (52)$$

The dynamic error component is to be ascribed to the vibration, it being necessary to insert the engraving time $t_G$ in the time function ZTF of all the segments for t. As has already been shown earlier, the engraving time $t_G$ can be replaced by the number of encoder pulses. In this case, it is necessary to substitute that number which corresponds to the time interval between measurement and engraving, and this is given by (49a).

$$ZTF = \cos(\kappa \cdot t_G + \theta) = \cos\left(\frac{\kappa}{\omega} \cdot \frac{k + N_\Gamma}{N_{um}} \cdot 2 \cdot \pi + \theta\right) \quad (53)$$

$$db_{rad,dyn} = c_{dyn} \cdot \left[\sin\left(n \cdot \frac{k}{N_{um}} \cdot 2 \cdot \pi + \Phi\right) - \sin\left(n \cdot \frac{k+1}{N_{um}} \cdot 2 \cdot \pi + \Phi\right)\right] \cdot ZTF \quad (54)$$

$$\cong -c_{dyn} \cdot n \cdot \frac{2 \cdot \pi}{N_{um}} \cdot \cos\left(n \cdot \frac{k}{N_{um}} \cdot 2 \cdot \pi + \Phi\right) \cdot ZTF$$

The following is obtained for the tangential segment $$db_{\tan}(k) = \left(R_0 + \frac{\Delta s_{sens,1,static}(k) + \Delta s_{sens,static}(k+1)}{2}\right) \cdot \frac{2 \cdot \pi}{N_{um}} \quad (55)$$

The geometrically combined sublength becomes $$db(k) = \sqrt{[db_{\tan}(k)]^2 + [db_{rad,stat}(k) + db_{rad,dyn}(k)]^2} \quad (56)$$

The summation of these sublengths is best carried out at first for a complete circumference, in order to be able to determine a correction factor $K_{corr}$ already used earlier. This is also intended here to compensate effects such as those of sensor displacement or the polygon effect.

The result is $$K_{corr} = \frac{\sum_{k=k_B}^{N_{um}+k_B} db(k)}{2 \cdot \pi \cdot R_0} \quad (57)$$

It now further follows for the arc lengths of the partial circumference of the real stencil that $$Umf_{act}(k) = \sum_{i=k_B}^{i=k_B+k} db(i) \quad (58)$$

and for the arc length of the partial circumference of the ideal stencil that $$Umf_{des}(k) = 2 \cdot \pi \cdot \frac{k - k_n}{N_{um}} \cdot R_0 \quad (59)$$

Finally, it is possible from this to form the incorrect circumferential position of the first type of the pattern image at the point on the stencil circumference which is assigned to the memory address k. However, this incorrect circumferential position holds at the time of emission of the $(k+N_{\Gamma 1})$-th pulse.

$$U1 = Umf_{des}(k) - Umf_{act}(k) \quad (60)$$

As has already been shown in explaining the relationship (18), this value for $\Delta U1$ can be used to form the address correction component required to compensate the incorrect circumferential position of the first type of the pattern image.

$$\Delta z I \langle k + N_{\Gamma 1} \rangle = \frac{N_{um}}{2 \cdot \pi \cdot R_0} \cdot \Delta U I \qquad (61)$$

To compensate the incorrect circumferential position of the second type of the pattern image, it is necessary to know the incorrect radial distance position. Here, the latter is composed of the static incorrect position $\Delta s_{sens,1,static}$ in accordance with the relationship (48), and a dynamic component according to the relationships (53) and (54). A theoretically exact calculation of the location and instant at which a drop impinges on the stencil surface is not possible. Since, however, the vibration frequency very probably corresponds to the frequency of the disturbing force, and this is the rotational speed, complete vibration periods are covered during a complete rotation.

Compared with the stencil circumference, the possible deviation in the position of the location that the drop impinges on the real stencil is very much smaller compared with that on the ideal stencil. This also holds even should the vibrational frequency correspond to two, three or four times the rotational speed.

The difficulty in estimating the dynamic displacement of the stencil wall as a consequence of the vibration can, however, be avoided by measuring the radial position of the stencil directly at the location where the liquid is applied, for example by providing a ranging sensor directly at the nozzle outlet, for example an induction coil which surrounds the nozzle outlet. The same then also holds for the possible time difference between the impingement of the drop on the real and ideal stencils by comparison with the vibration period. Consequently, the possible change in position which the stencil wall can experience as a consequence of the vibration within this small time difference is also so small that the value $db_{rad,dyn}(k)$ according to (54) can be set with adequate approximation for the additional, dynamic, radial vibrational deflection. The additional deflection caused by the vibration can thus be regarded for determining the address correction as a constant value which appears additively in relation to the incorrect radial position $\Delta s_{sens,1,static}$. The address correction component for the incorrect circumferential position of the second type of the pattern image can then be determined in the same way as this was derived for the non-vibrating, stopped stencil wall when determining the relationships (19) and (20):

$$\Delta z_{2,1}(k) = -(\Delta s_{Sens,1,stat}(k) + db_{rad,dyn}(k)) \cdot \frac{w}{u} \cdot \frac{N_{um}}{2 \cdot \pi \cdot R_0} \qquad (62)$$

$$\Delta z_2 \langle k + N_{\Gamma} \rangle = \qquad (63)$$
$$- \frac{(\Delta s_{Sens,1,static}(k) + db_{rad,dyn}(k))^2}{2 \cdot \Delta s_{Sens,1,stat}(k) - \Delta s_{Sens,1,stat}(k - \Delta z_{2,1}(k)) + db_{rad,dyn}(k)} \cdot$$
$$\frac{w}{u} \cdot \frac{N}{2 \cdot \pi \cdot R_0}$$

A further increase in the accuracy of the specified address corrections can be achieved if, instead of the value $N_{\Gamma 1}$ calculated according to (49a), use is made in (53) of a value $N_{\Gamma 2}$ for the number of pulses up to the probable point where the drop impinges on the stencil wall which is yielded from the value $N_\Gamma$ and the transit time, shortened by the distance error $D_{sens,1,static}(k) + db_{rad,dyn}(k)$, of the drop from the nozzle up to the stencil wall. As already set forth when deriving the relationship (9), $N_\Gamma$ corresponds to the number of pulses which were emitted by the encoder between the appearance of a stencil point at the sensor and the instant of ejection of the drop, assigned to this stencil point, from the nozzle. The distance $L_T$ to be traversed by the drop is situated between the nozzle and the stencil. However, this distance is shortened by the previously specified distance error (positive distance fields [sic] correspond to an increase in $R_0$). The transit time of the drop from the nozzle to the stencil surface then corresponds to $$t_{Tropf} = \frac{L_T - \Delta s_{Sens,1static}(k) - db_{rad,dy}(k)}{w} \qquad (64)$$

The number of pulses emitted during this time is $$N_T = t_{drop} \cdot \frac{\omega}{2 \cdot \pi} \cdot N_{Um} \qquad (65)$$

from which it follow for the better value that $$N_{\Gamma 2} = N_\Gamma + N_T = N_\Gamma + \frac{L_T - \Delta s_{Sens,1static}(k) - db_{rad,dyn}(k)}{w} \cdot \frac{\omega}{2 \cdot \pi} \cdot N_{Um} \qquad (66)$$

The outlay on computation for determining the corrections $\Delta z1$ and $\Delta z2$ appears complex, at first. However, this complexity of the calculation appears only when the program is being set up. It is substantially more important to take account of the outlay constantly required on computation, and to weigh up whether this outlay can be justified for a given computer performance, or what costs are caused when the computer performance is matched to the required outlay. It is to be considered here that only very slight differences occur in the magnitude of the amplitude of vibration over sections of the stencil which are approximately 10 mm long, and that correction values once calculated within these sections hold for all pattern series present here. The vibrational form, that is to say the order of the vibration, is maintained over the entire length of the stencil and changes only if the exciting frequency changes. Bearing in mind that the width of an engraving line amounts at most to 100 $\mu$m, this means that the computing run described has to be carried out only once for approximately 100 rotations of the stencil, and this outlay appears to be justifiable.

Figure 7:
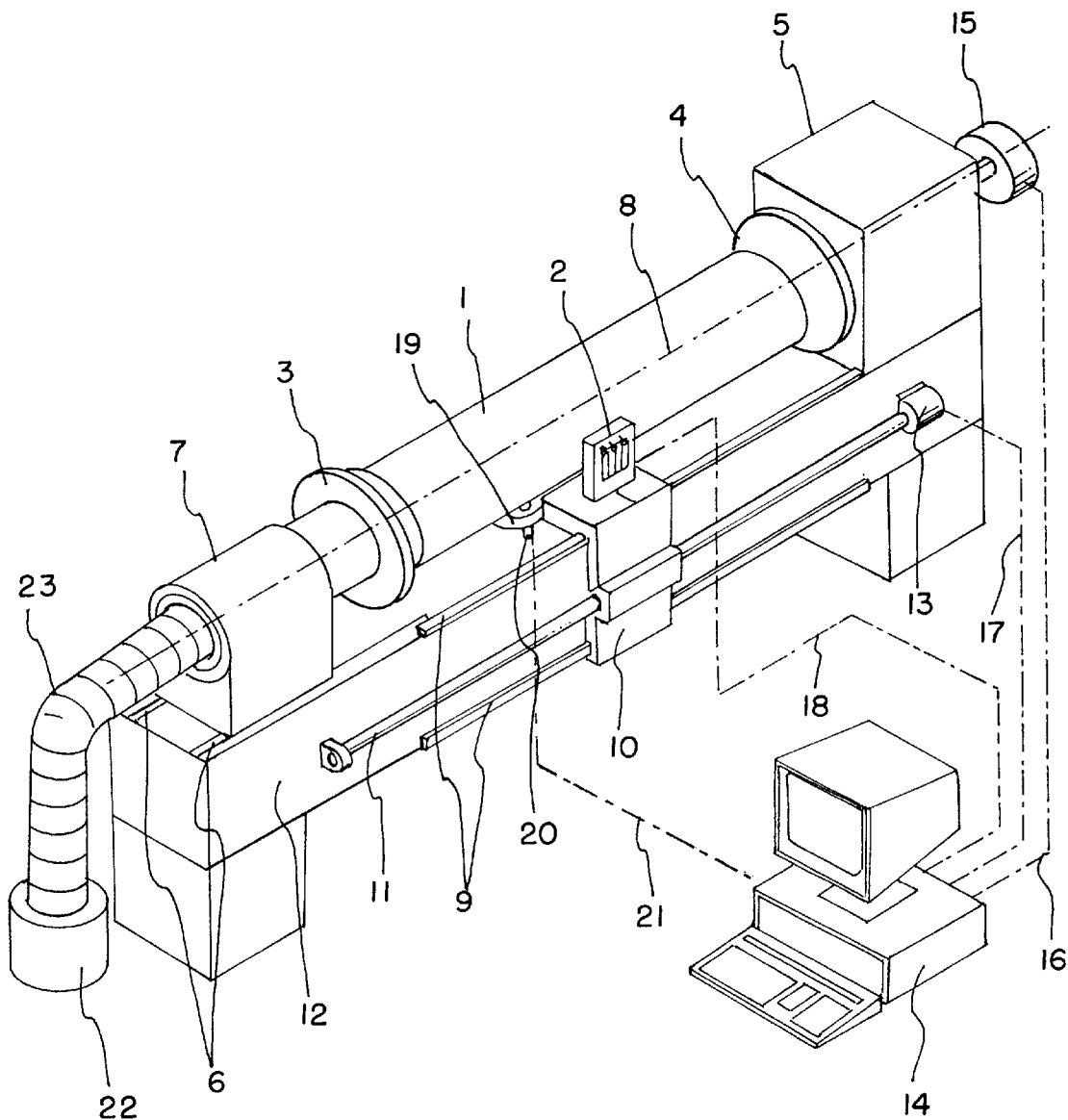
FIG. 7 shows diagrammatically the overall structure of the device according to the invention.

A device according to the invention for carrying out the method described above is shown in FIG. 7. In FIG. 7, a thin hollow screen cylinder is to have a pattern image applied by nozzles 2. One or more mutually parallel nozzles which are arranged next to one another in the longitudinal direction of the cylinder can be involved here. The hollow screen cylinder 1 is mounted rotatably by means of two supporting cones 3 and 4 engaging in its end faces, these supporting cones 3 and 4 centering the hollow screen cylinder 1. The latter is connected in a rotationally fixed fashion to the supporting cones 3 and 4 by frictional grip, but can rotate in common with them. The supporting cone 4 located on the drive side is set rotating by a rotary drive (not represented in more detail) inside a spindle box 5. Together with a tailstock 7, the supporting cone 3 located on the tailstock side is moved so far on guides 6 up to the left-hand end of the hollow screen cylinder 1 that this supporting cone 3 engages in the hollow screen cylinder 1 and presses the latter against the supporting cone 4. In this way, the hollow screen cylinder 1 is centered and coupled to the supporting cones 3, 4 by means of frictional grip. The rotary movement of the supporting cone 4 is thereby transmitted onto the hollow screen cylinder 1 and the supporting cone 3. Although the supporting cone 3 is rotatably mounted in the tailstock 7, it is only driven in special cases, but then in synchronism with the supporting cone 4.

Mounted on a carriage 10 moving parallel to the axis 8 of rotation of the hollow screen cylinder 1 on guides 9 are the nozzles 2 which serve to eject, for example, a polymerizable or a radiation-absorbing liquid. The carriage 10 is moved by a spindle 11 in the longitudinal direction of the hollow screen cylinder 1. The guides 9 and the spindle 11 are fastened to a machine bed 12 on which the spindle box 5 and the tailstock 7 are also seated. The spindle 11 is set rotating by a stepping motor 13. The nozzles 2 eject liquid in accordance with the requirements of the pattern or pattern image to be applied to the hollow screen cylinder 1.

For this purpose, the pattern image, which is stored in a suitable form in an electronic memory, is retrieved by a computer 14 from the memory present in it. This retrieval of the pattern data or the information on the pattern image by the computer 14 is performed in accordance with the instantaneous position of the point where the liquid drops impinge on the hollow screen cylinder 1 from the nozzles 2. Via a control line 18 to the nozzles 2, the computer 14 relays to the latter the command to eject or not to eject a liquid drop. The nozzles 2 require power signals in order to be actuated, and for this purpose either appropriate power amplifiers are further provided at the output of the computer 14, or amplifiers are arranged in the course of the control line 18, for example directly upstream of the nozzles 2. For the sake of clarity, these power amplifiers are not represented in the drawing. The instantaneous position of a point where the liquid drops impinge is determined by the computer 14, on the one hand from the circumferential position of the hollow screen cylinder 1, which is transmitted to it via an encoder 15 and a signal line 16 connected to the latter and, on the other hand, from the longitudinal position of the carriage 10, which is known to the computer 14, because the latter emits the signals for the stepping motor 13 to said motor 13 via a drive line 17.

A bow 19 is connected to the carriage 10 and comes to lie below the hollow screen cylinder 1 and surrounds the latter at a distance, for example in the shape of a circular arc or semicircle. The bow 19 is thus correspondingly moved in sympathy with the movement of the carriage 10 in the direction of the cylinder axis 8. Attached to the bow 19, or recessed therein are one or more ranging sensors 20 which are aligned radially relative to the hollow screen cylinder 1 and measure the distance between them and the surface or lateral surface of the hollow screen cylinder 1. The distance-measuring signals are sent via a line 21 to the computer 14. The bow 19 can carry, for example, three ranging sensors 20 which are situated at different circumferential positions on the hollow screen cylinder 1. These ranging sensors 20 are used to measure at respectively fixed measuring positions radial distances between them and the actual position of the wall of the hollow screen cylinder 1 for a multiplicity of circumferential positions of the hollow screen cylinder 1 when the latter is rotating. The respective measuring signals are then processed in the computer 14, in order to determine the radial and tangential positionally deviations from the measured distances between sensor and hollow cylinder surface.

Also provided is a gas delivery device 22 which is connected via a flow duct 23 to a channel which extends in the interior of the railstock 7 and supporting cone 3 and sets up a flow connection into the interior of the hollow screen cylinder 1. In order to build up an overpressure in the interior of the hollow screen cylinder 1, a pressurized gas can be led into said interior via the flow duct 23 by the gas delivery device 22.

Figure 8:
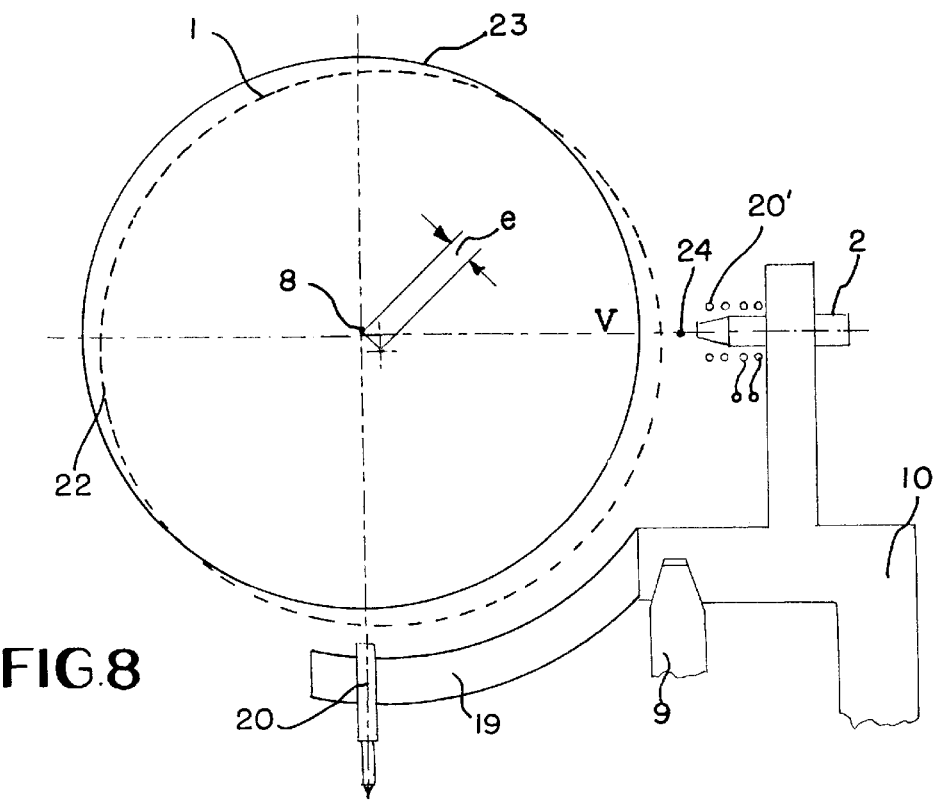
FIG. 8 shows a section through the device according to FIG. 7 in the region of the stencil cylinder perpendicular to the cylinder axis.

FIG. 8 shows a cross-section through the hollow screen cylinder 1, which is mounted eccentrically by comparison with the axis 8 of rotation of the device according to FIG. 7. The dashed line specifies the actual position of the hollow screen cylinder 1, while the continuous line marks its proper desired position. The deviations of the real cross-sectional position 22 or actual position of the hollow screen cylinder 1 by comparison with its desired position 23 are very greatly exaggerated. These deviations are detected by the sensor 20, which measures the positionally deviations produced in a way known per se, either inductively, capacitively or optically.

A drop 24 ejected from the nozzle 2 flies at the speed v towards the hollow screen cylinder 1 and finally impinges on the lateral surface of the hollow screen cylinder 1. If the hollow screen cylinder 1 exhibits a positive radial deviation, that is to say if it is displaced in the direction of the nozzle 2, the air path for the liquid drop 24 is shortened and the latter actually impinges too early on the lateral surface of the hollow screen cylinder 1. The reverse conditions obtain when the lateral surface of the hollow screen cylinder 1 moves away from the nozzle 2.

As already mentioned at the beginning, this radial displacement, but also an associated tangential displacement of the positions provided for the pressure are compensated by correspondingly selecting earlier or later addresses of the pattern data filed in the electronic memory in the circumferential direction of the hollow screen cylinder 1. A sensor similar to the sensor 20 could also be arranged on the nozzle 2 and opposite the hollow screen cylinder 1, in order to measure the actual radial position of the hollow screen cylinder 1. For example, the sensor could be an induction coil which concentrically surrounds the nozzle outlet. Such a coil is indicated by the reference symbol 20'.

Figure 9:
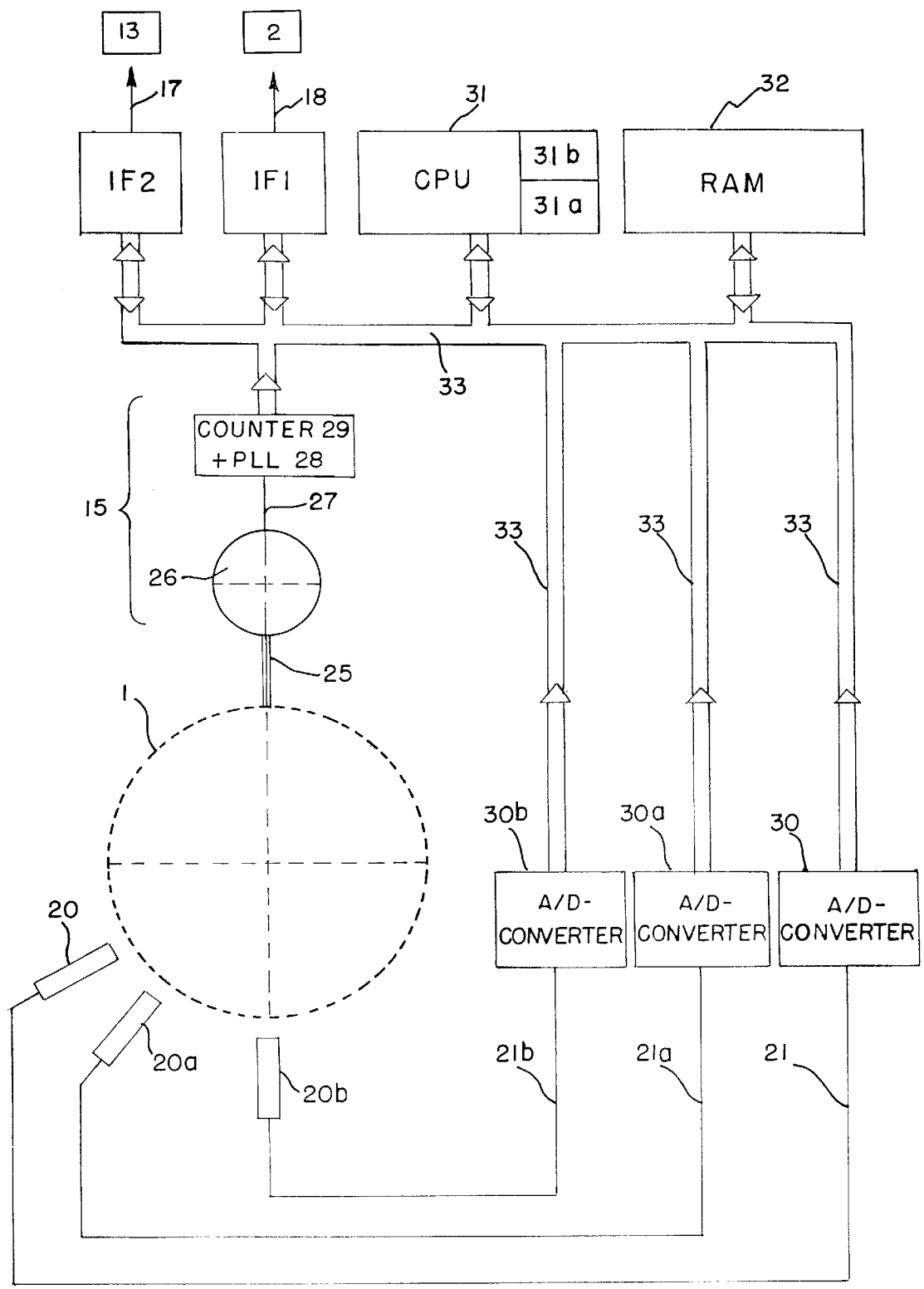
FIG. 9 shows a block diagram of the device according to the invention in accordance with FIG. 7.

FIG. 9 shows a block diagram of the device according to the invention, with the aid of which the method according to the invention is realized. The stencil cylinder 1 shown in cross-section is surrounded by three sensors 20, 20a and 20b. This number of sensors is, however, only necessary if the stencil is not a stopped but a vibrating one. Otherwise, one sensor suffices.

The stencil cylinder 1 is connected to a pulse generator 26 in a torsionally rigid fashion by a shaft 25. The pulse generator 26 transmits its pulse signals via a data line 27 to a phase locked loop PLL 28 which multiplies the pulses electronically (for example by a factor 10). The pulses thus multiplied are used to increment a counter 29 until a zero signal likewise emitted by the pulse generator 26 resets the counter 29 to zero. This zero signal is emitted, for example, whenever a zero mark passes a corresponding scanning point inside the pulse generator. This zero mark is then also identical to the zero mark NM, already mentioned earlier, of the stencil cylinder 1, which need not actually be present at all on the latter but which, for example, can be sprayed onto the stencil cylinder 1 at the start of the engraving work by the nozzle(s) and then in the same position as the zero mark of the pulse generator 26.

The module which comprises the pulse generator 26, PLL 28 and counter 29 is referred to as the encoder 15. Of course, the latter can also be replaced by an incremental encoder, provided only that the latter has a sufficiently high resolution.

The sensors 20, 20a, 20b continuously supply measured distance values as analog signals via measuring lines 21, 21a, 21b to A/D converters 30, 30a, 30b, which convert these into digital values. Via a data bus, a central processor unit CPU 31 receives from the A/D converters 30, 30a and 30b the digital distance values which have been formed, and processes these in a way which has been described earlier in discussing the interrelationships concerning the method.

In order to be able to assign the digital measured distance values to the correct circumferential point on the stencil cylinder 1, directly before reading the measured distance values the CPU 31 must read out the instantaneous circumferential position stored in the counter 29. For this purpose, the counter 29 is also connected to the data bus of the CPU 31. The respectively calculated distance differences and/or the address differences to be taken into account are stored by the CPU 31 under the address in a RAM 32 which corresponds to the counter reading when reading out the digital measured distance values.

Furthermore, the CPU 31 operates the nozzle(s) 2 via the interface module IF 1 and, likewise, the stepping motor 13 via the interface module IF 2. The entire traffic between the CPU and the modules is handled via the data and address bus 33. Because of the very large task of work which the CPU 31 has to cope with between each two pulses, the CPU 31 can, of course, be supported by parallel processors.

Subsequently, the interface modules IF 1 and IF 2 are assigned the task of converting the data word present at their respective bus input into the correct serial pulse information for the respectively connected peripheral module, and of amplifying it, if appropriate.

It may further be pointed out that an address counter 31a for selecting memory addresses of the RAM 32 can be part of the CPU 31. The address changeover device, which generates an address changeover signal for activating the address counter 31a as a function of the output signal of the ranging sensor or sensors 20, 20a, 20b, can also be a part of the CPU 31. The address changeover device then bears the reference symbol 31b.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

The following Table is provided to aid in an understanding of various symbols and descriptions in the noted drawings:

| | |
|---|---|
| FIG. 1 | DA = Axis of Rotation |
| | NM = Zero mark |
| | $S_o$ = Distance of the sensor from the ideal stencil |
| | $S_{sen}$ = Distance of the sensor from the real stencil |
| | w = Flying speed of the drop |
| FIG. 2 | DA = Axis of rotation |
| | NM - Zero mark |
| | MP = Center of the real stencil |
| | $S_o$ = Distance of the sensor from the ideal stencil |
| | $S_{sen}$ = Distance of the sensor from the real stencil |
| FIG. 5 | $A_k$ = Amplitude of the "node" in the circumferential direction of the stencil |
| Antinode | Antinode only for movement component of the vibration which is normal to the surface of the stencil = node for the movement component of the vibration which falls into the circumferential direction of the stencil |
| Node | Node only for a movement component of the vibration which is normal to the surface of the stencil = antinode for the movement component of the vibration which falls into the circumferential direction of the stencil |

I claim:

1. A method for producing a printing stencil, comprising the steps of:

transferring a pattern stored in an electronic memory by applying liquid to a lateral surface of the printing stencil as it rotates, said transferring comprising;

determining an offset in the electronic memory as a function of at least one deviation between an actual position and a desired position of the lateral surface occurring during a time in which liquid travels from a nozzle to the lateral surface;

reading out pattern data stored in said electronic memory in accordance with said offset; and driving the nozzle spraying the liquid in accordance with pattern data which have been read out, thereby preventing displacement of the pattern owing to the deviation.

2. The method according to claim 1, further comprising measuring an actual radial position of the lateral surface at at least one measuring point.

3. The method according to claim 2, wherein said measuring includes measuring the actual position of the lateral surface at the location where the liquid is applied.

4. The method according to claim 2, wherein said measuring includes measuring the actual position of the lateral surface at at least one measuring point outside the region in which the liquid is applied.

5. The method according to claim 2, further comprising determining the deviation between the actual and desired positions of the lateral surface from the measured actual radial position at each of said at least one measuring point.

6. The method according to claim 2, where said measuring includes measuring the actual position of the lateral surface at three measuring points spaced apart from one another in the same circumferential plane, in order to determine therefrom the deviation between the actual and desired positions of the lateral surface, or the pattern displacement in the region where the liquid is applied.

7. The method according to claim 1, further comprising determining the deviation between the actual and desired positions of the lateral surface as a function of at least one of the radial deviation and tangential deviation of the lateral surface from the respective desired position.

8. The method according to claim 1 further comprising activating an address counter which addresses the electronic memory as a function of the pattern displacement determined.

9. The method according to claim 1, further comprising using a thin-walled hollow cylinder in whose interior an overpressure is generated as the stencil cylinder.

10. The method according to claim 2, further comprising determining the pattern displacement in the region where the liquid is applied from the measured actual radial position at each of said at least one measuring point.

11. The method according to claim 1, further comprising determining the pattern displacement in the region where the liquid is applied as a function of at least one of the radial deviation and tangential deviation of the lateral surface from the respective desired position.

12. A device for producing a printing stencil, comprising:

a bearing device for rotatably bearing a stencil cylinder;

an electronic memory for storing a pattern;

an address counter for the electronic memory;

at least one nozzle for spraying out liquid, in order to transfer the pattern onto a lateral surface of the stencil cylinder;

a control device which reads out the pattern with the stencil cylinder rotating and drives the nozzle in accordance with the pattern data read out; and an address changeover device for changing over a count value of the address counter as a function of at least one deviation between the actual and desired positions of the lateral surface in the region where the liquid is applied occurring during a time in which the liquid travels from the at least one nozzle to the lateral surface.

13. The device according to claim 12, further comprising at least one ranging sensor for measuring the actual radial position of the lateral surface of the stencil cylinder is present, wherein the address changeover device generates an address changeover signal for activating the address counter as a function of the output signal of the ranging sensor.

14. The device according to claim 13, wherein the at least one ranging sensor is situated outside the region where the liquid is applied.

15. The device according to claim 13, wherein the nozzle is constructed as a ranging sensor or includes such a ranging sensor.

16. The device according to claim 12, further including a pressure generator for generating an internal pressure inside a hollow stencil cylinder.

17. The device according to claim 13, wherein the at least one ranging sensor includes a plurality of ranging sensors, arranged at a fixed distance from one another relative to the longitudinal direction of the stencil cylinder.

* * * * *